(12) United States Patent
Tan et al.

(10) Patent No.: US 11,513,277 B2
(45) Date of Patent: Nov. 29, 2022

(54) LIGHT GUIDE SUBSTRATE AND METHOD OF MANUFACTURING THE SAME, OPPOSITE SUBSTRATE AND LIQUID CRYSTAL DISPLAY APPARATUS

(71) Applicant: BOE TECHNOLOGY GROUP CO., LTD., Beijing (CN)

(72) Inventors: Jifeng Tan, Beijing (CN); Xiandong Meng, Beijing (CN); Wenqing Zhao, Beijing (CN); Xiaochuan Chen, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 121 days.

(21) Appl. No.: 17/044,268

(22) PCT Filed: Sep. 3, 2019

(86) PCT No.: PCT/CN2019/104211
§ 371 (c)(1),
(2) Date: Sep. 30, 2020

(87) PCT Pub. No.: WO2021/042265
PCT Pub. Date: Mar. 11, 2021

(65) Prior Publication Data
US 2021/0165155 A1   Jun. 3, 2021

(51) Int. Cl.
*F21V 8/00*   (2006.01)
*G02F 1/1335*   (2006.01)
*G02F 1/1368*   (2006.01)

(52) U.S. Cl.
CPC ......... *G02B 6/0038* (2013.01); *G02F 1/1368* (2013.01); *G02F 1/133512* (2013.01)

(58) Field of Classification Search
None
See application file for complete search history.

(56) References Cited

U.S. PATENT DOCUMENTS

| | | | |
|---|---|---|---|
| 2018/0144929 A1 | 5/2018 | Liu et al. | |
| 2020/0285104 A1 | 9/2020 | Meng et al. | |

(Continued)

FOREIGN PATENT DOCUMENTS

| | | |
|---|---|---|
| CN | 106856163 A | 6/2017 |
| CN | 109061948 A | 12/2018 |

(Continued)

*Primary Examiner* — Thanh Nhan P Nguyen
(74) *Attorney, Agent, or Firm* — Procopio, Cory, Hargreaves & Savitch LLP

(57) ABSTRACT

A method of manufacturing a light guide substrate includes: providing a first base substrate; forming an interface protection layer on a side of the first base substrate; forming a grating structure layer at the side of the first base substrate where the interface protection layer has been formed; removing portions of the grating structure layer corresponding to the non-light extraction opening regions, so as to obtain a plurality of light extraction grating units in one-to-one correspondence with the plurality of light extraction opening regions; and removing portions of the interface protection layer corresponding to the non-light extraction opening regions. The first base substrate includes a plurality of light extraction opening regions and non-light extraction opening regions other than the plurality of light extraction opening regions.

19 Claims, 15 Drawing Sheets

(56) References Cited

U.S. PATENT DOCUMENTS

2021/0141139 A1\* 5/2021 Meng ................ G02F 1/133615
2021/0173137 A1\* 6/2021 Meng ................... G02B 6/0093

FOREIGN PATENT DOCUMENTS

| CN | 109212834 A | 1/2019 |
| CN | 110161620 A | 8/2019 |
| JP | 2011170257 A | 9/2011 |
| WO | 2020093766 A1 | 5/2020 |

\* cited by examiner

LIGHT GUIDE SUBSTRATE AND METHOD OF MANUFACTURING THE SAME, OPPOSITE SUBSTRATE AND LIQUID CRYSTAL DISPLAY APPARATUS

CROSS-REFERENCE TO RELATED APPLICATION

This application is a national phase entry under 35 USC 371 of International Patent Application No. PCT/CN2019/104211 filed on Sep. 3, 2019, which is incorporated herein by reference in its entirety.

TECHNICAL FIELD

The present disclosure relates to the field of display technologies, and in particularly, to a light guide substrate and a method of manufacturing the same, an opposite substrate and a liquid crystal display apparatus.

BACKGROUND

In the field of liquid crystal display, with respect to a liquid crystal display device that uses the diffraction of the liquid crystal grating to realize display, a working principle thereof is to apply voltage driving signals to a liquid crystal layer, so that the liquid crystal layer forms a liquid crystal grating. By utilizing the diffraction of the liquid crystal grating, light exits, thereby realizing display. By changing the driving voltage signals applied to the liquid crystal layer, a diffraction efficiency of the liquid crystal grating is changed to realize the display of different gray scales. Since there is no need to arrange polarizers in the liquid crystal display device, light transmittance is high.

SUMMARY

In a first aspect, a method of manufacturing a light guide substrate is provided. The method includes: providing a first base substrate; forming an interface protection layer on a side of the first base substrate; forming a grating structure layer at the side of the first base substrate where the interface protection layer has been formed; removing portions of the grating structure layer corresponding to the non-light extraction opening regions, so as to obtain a plurality of light extraction grating units in one-to-one correspondence with the plurality of light extraction opening regions; and removing portions of the interface protection layer corresponding to the non-light extraction opening regions. The first base substrate includes a plurality of light extraction opening regions and non-light extraction opening regions other than the plurality of light extraction opening regions In some embodiments, after the step of forming the interface protection layer on a side of the first base substrate, the method further includes: patterning the interface protection layer, and removing portions of the interface protection layer corresponding to the plurality of light extraction opening regions.

In some embodiments, in the step of patterning the interface protection layer and removing portions of the interface protection layer corresponding to the plurality of light extraction opening regions, and the step of removing portions of the interface protection layer corresponding to the non-light extraction opening regions, a wet etching process is used to remove corresponding portions of the interface protection layer.

In some embodiments, a material of the interface protection layer is metal, metal alloy or metal oxide.

In some embodiments, in the step of removing portions of the grating structure layer corresponding to the non-light extraction opening regions, when the portions of the grating structure layer corresponding to the non-light extraction opening regions are completely removed, in the portions of the interface protection layer corresponding to the non-light extraction opening regions, a thickness of a part thereof that is not covered by the grating structure layer is greater than or equal to 0.

In some embodiments, an etching process is used to remove the portions of the grating structure layer corresponding to the non-light extraction opening regions. In the step of removing portions of the grating structure layer corresponding to the non-light extraction opening regions, etching selectivity of etching a material of the grating structure layer to etching a material of the interface protection layer is greater than or equal to 10.

In some embodiments, in the step of removing portions of the grating structure layer corresponding to the non-light extraction opening regions, a dry etching process is used to remove corresponding portions of the grating structure layer.

In some embodiments, the step of removing portions of the grating structure layer corresponding to the non-light extraction opening regions includes: forming a protective adhesive layer on a side of portions of the grating structure layer corresponding to the light extraction opening regions away from the first base substrate, so that the protective adhesive layer covers the portions of the grating structure layer corresponding to the light extraction opening regions; removing the portions of the grating structure layer corresponding to the non-light extraction opening regions; and removing the protective adhesive layer.

In a second aspect, a light guide substrate is provided. The light guide substrate includes: a first base substrate; a plurality of interface protection structures disposed on a side of the first base substrate; and a plurality of light extraction grating units disposed on a side of the plurality of interface protection structures away from the first base substrate. The first base substrate includes a plurality of light extraction opening regions and non-light extraction opening regions other than the plurality of light extraction opening regions. The plurality of interface protection structures are in one-to-one correspondence with the plurality of light extraction opening regions. The plurality of light extraction grating units are in one-to-one correspondence with the plurality of interface protection structures.

In some embodiments, the light guide substrate further includes: a planarization layer covering the plurality of light extraction grating units; a first buffer layer disposed on a side of the planarization layer away from the first base substrate; and a second buffer layer disposed on a side of the first buffer layer away from the first base substrate. A material of the first buffer layer is different from a material of the second buffer layer.

In some embodiments, a refractive index of the first buffer layer is between a refractive index of the planarization layer and a refractive index of the second buffer layer.

In some embodiments, the material of the first buffer layer is oxide, the material of the second buffer layer is nitride, and the material of the first buffer layer and the material of the second buffer layer include a same element.

In some embodiments, the material of the first buffer layer is silicon oxide, and the material of the second buffer layer is silicon nitride.

In some embodiments, a thickness of the first buffer layer is 0.3 µm, a thickness of the second buffer layer is 0.1 µm, and a thickness of the planarization layer is 0.825 µm.

In some embodiments, the light guide substrate further includes: a pixel driving structure disposed on a side of the second buffer layer away from the first base substrate; a pixel electrode layer disposed on a side of the pixel driving structure away from the first base substrate; and a common electrode layer disposed on a side of the pixel electrode layer away from the first base substrate. The pixel driving structure includes a plurality of thin film transistors. A density of the second buffer layer is higher than a density of the planarization layer, and the density of the second buffer layer is higher than a density of the first buffer layer.

In a third aspect, a liquid crystal display apparatus is provided. The liquid crystal display apparatus includes: the light guide substrate as described in the second aspect; an opposite substrate disposed opposite to the light guide substrate; and a liquid crystal layer disposed between the light guide substrate and the opposite substrate. The opposite substrate includes: a second base substrate; and a black matrix layer disposed at a side of the second base substrate proximate to the light guide substrate. The black matrix layer has a plurality of openings, and orthographic projections of a plurality of light extraction grating units on the first base substrate are within a range of an orthographic projection of the black matrix layer on the first base substrate. The liquid crystal layer is configured such that, under action of an electric field, light exiting from the light guide substrate reaches the black matrix layer; or, the light exiting from the light guide substrate reaches light exit regions formed by the plurality of openings of the black matrix layer.

In some embodiments, the opposite substrate further includes: an organic transmission layer disposed on a side of the black matrix layer away from the second base substrate; and a third buffer layer disposed at a side of the black matrix layer proximate to the second base substrate. A direction of an internal stress of the third buffer layer is opposite to a direction of an internal stress of the organic transmission layer.

In some embodiments, a material of the third buffer layer is silicon nitride.

In some embodiments, a thickness of the organic transmission layer is 15 µm to 20 µm, and a thickness of the third buffer layer is 0.5 µm to 1 µm.

In some embodiments, the opposite substrate further includes a bonding layer disposed between the third buffer layer and the black matrix layer.

In some embodiments, a material of the bonding layer is silicon dioxide, and a thickness of the bonding layer is 0.3 µm.

In a fourth aspect, a light guide substrate is provided. The light guide substrate includes: a first base substrate; a plurality of light extraction grating units disposed on a side of the first base substrate; a planarization layer covering the plurality of light extraction grating units; a first buffer layer disposed on a side of the planarization layer away from the first base substrate; and a second buffer layer disposed on a side of the first buffer layer away from the first base substrate. A material of the first buffer layer is different from a material of the second buffer layer.

In some embodiments, a refractive index of the first buffer layer is between a refractive index of the planarization layer and a refractive index of the second buffer layer.

In some embodiments, the material of the first buffer layer is oxide, the material of the second buffer layer is nitride, and the material of the first buffer layer and the material of the second buffer layer include a same element.

In some embodiments, the material of the first buffer layer is silicon oxide, and the material of the second buffer layer is silicon nitride.

In some embodiments, a thickness of the first buffer layer is 0.3 µm, a thickness of the second buffer layer is 0.1 µm, and a thickness of the planarization layer is 0.825 µm.

In some embodiments, the light guide substrate further includes: a pixel driving structure disposed on a side of the second buffer layer away from the first base substrate; a pixel electrode layer disposed on a side of the pixel driving structure away from the first base substrate; and a common electrode layer disposed on a side of the pixel electrode layer away from the first base substrate. The pixel driving structure includes a plurality of thin film transistors. A density of the second buffer layer is higher than a density of the planarization layer, and is higher than a density of the first buffer layer.

In a fifth aspect, a liquid crystal display apparatus is provided. The liquid crystal display apparatus includes: the light guide substrate as described in the third aspect; an opposite substrate disposed opposite to the light guide substrate; and a liquid crystal layer disposed between the light guide substrate and the opposite substrate. The opposite substrate includes: a second base substrate; and a black matrix layer disposed at a side of the second base substrate proximate to the light guide substrate. The black matrix layer has a plurality of openings, and orthographic projections of a plurality of light extraction grating units on the first base substrate are within a range of an orthographic projection of the black matrix layer on the first base substrate. The crystal liquid layer is configured such that, under the action of the electric field, the light exiting from the light guide substrate reaches the black matrix layer; or, the light exiting from the light guide substrate reaches light exit regions formed by the plurality of openings of the black matrix layer.

In a sixth aspect, an opposite substrate is provided. The opposite substrate includes: a second base substrate; an organic transmission layer disposed at a side of the second base substrate; and a third buffer layer disposed between the second base substrate and the organic transmission layer. A direction of an internal stress of the third buffer layer is opposite to a direction of an internal stress of the organic transmission layer.

In some embodiments, the material of the third buffer layer is silicon nitride.

In some embodiments, a thickness of the organic transmission layer is 15 µm to 20 µm, and a thickness of the third buffer layer is 0.5 µm to 1 µm.

In some embodiments, the opposite substrate further includes a bonding layer disposed between the organic transmission layer and the third buffer layer.

In some embodiments, the material of the adhesive layer is silicon dioxide, and a thickness of the adhesive layer is 0.3 µm.

In some embodiments, the opposite substrate further includes: a black matrix layer disposed at a side of the organic transmission layer proximate to the second base substrate. The black matrix layer has a plurality of openings.

In a seventh aspect, a liquid crystal display apparatus is provided. The liquid crystal display apparatus includes: a light guide substrate; the opposite substrate as described in the sixth aspect; and a liquid crystal layer disposed between the light guide substrate and the opposite substrate. The light guide substrate includes: a first base substrate; a plurality of light extraction grating units disposed on a side of the first base substrate facing the opposite substrate; a planarization layer covering the plurality of light extraction grating units; a pixel driving structure disposed on a side of the planarization layer away from the first base substrate, wherein the pixel driving structure includes a plurality of thin film transistors; a pixel electrode layer disposed on a side of the pixel driving structure away from the first base substrate; and a common electrode layer disposed on a side of the pixel electrode layer away from the first base substrate. The opposite substrate is disposed opposite to the light guide substrate, and orthographic projections of the plurality of light extraction grating units on the first base substrate are within a range of an orthographic projection of the black matrix layer on the first base substrate. The liquid crystal layer is configured such that, under the action of the electric field, the light exiting from the light guide substrate reaches the black matrix layer; or, the light exiting from the light guide substrate reaches light exit regions formed by a plurality of openings of the black matrix layer.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely some embodiments of the present disclosure, and a person of ordinary skill in the art can obtain other drawings according to these drawings.

DETAILED DESCRIPTION

The technical solutions in some embodiments of the present disclosure will be described clearly and completely in combination with accompanying drawings in the embodiments of the present disclosure. Obviously, the described embodiments are merely some but not all of embodiments of the present disclosure. All other embodiments obtained on a basis of embodiments of the present disclosure by a person of ordinary skill in the art shall be included in the protection scope of the present disclosure.

Figure 1A:
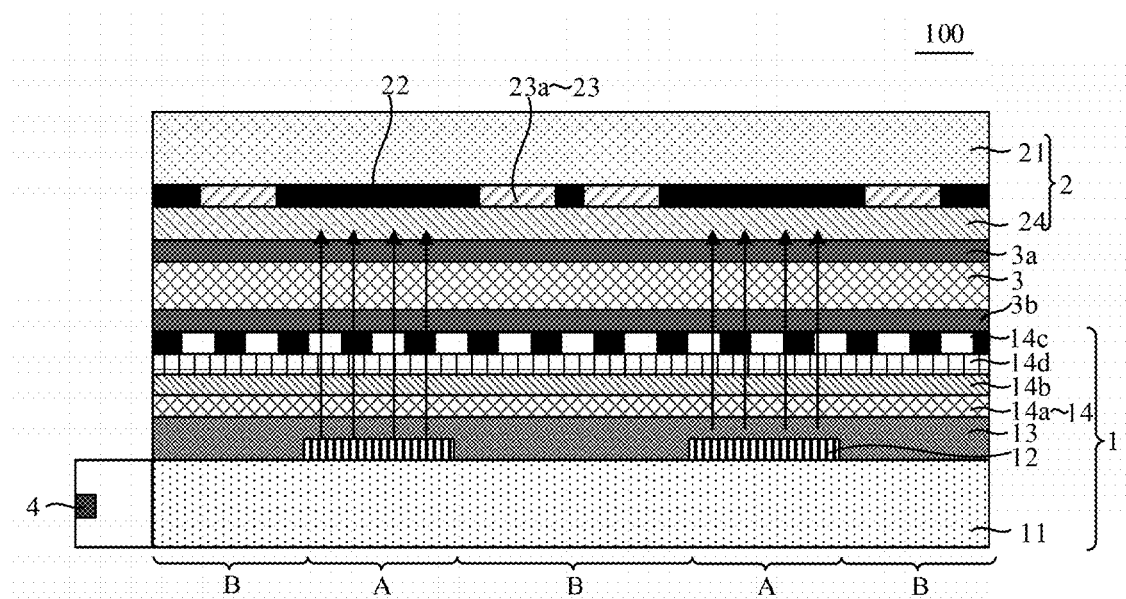
FIG. 1A is a schematic diagram of a liquid crystal display apparatus in the related art.
Figure 1B:
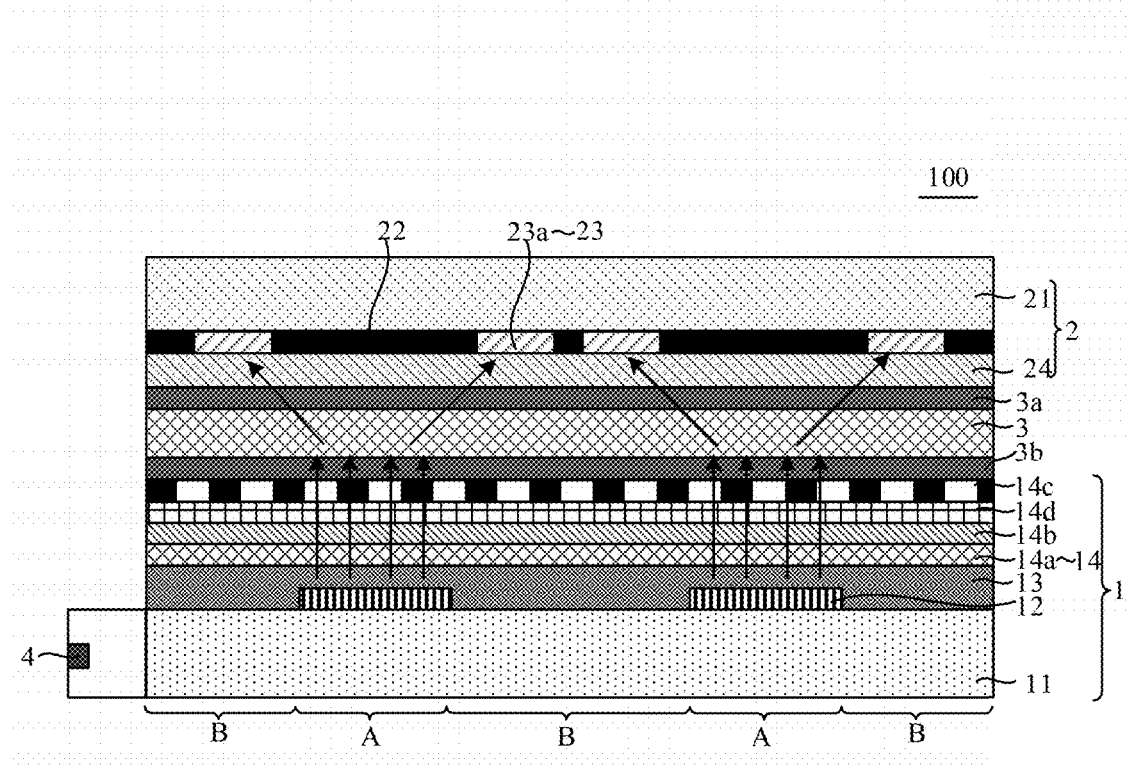
FIG. 1B is a schematic diagram of another liquid crystal display apparatus in the related art.

In the related art, as shown in FIGS. 1A and 1B, a liquid crystal display apparatus 100 includes: a light guide substrate 1 and an opposite substrate 2 that are disposed opposite to each other, and a liquid crystal layer 3 disposed between the light guide substrate 1 and the opposite substrate 2.

The light guide substrate 1 includes a first base substrate 11, a plurality of light extraction grating units 12, a planarization layer 13, a pixel driving structure 14, a pixel electrode layer 14b, an insulating layer 14d, and a common electrode layer 14c. The plurality of light extraction grating units 12 are disposed on a side of the first base 11. The planarization layer 13 covers the plurality of light extraction grating units 12.

The opposite substrate 2 includes a second base substrate 21, a black matrix layer 22 and a filter layer 23. The black matrix layer 22 has a plurality of openings, and the filter layer 23 includes a plurality of color filtering resists 23a. The plurality of color filtering resists 23a are disposed in light exit regions formed by the plurality of openings of the black matrix layer 22. Orthographic projections of the plurality of light extraction grating units 12 on the first base substrate 11 are within a range of an orthographic projection of the black matrix layer 22 on the first base substrate 11.

The liquid crystal display apparatus 100 further includes a light source 4 disposed at an end of the first base substrate 11. The light source 4 provides the liquid crystal display apparatus 100 with light required for display. The light emitted by the light source 4 is incident into the first base substrate 11, and propagates in the first base substrate 11 through total reflection. The plurality of light extraction grating units 12 are configured to extract the light propagating in the first base substrate 11 through total reflection at a collimation angle (As shown in FIG. 1A, an angle between the light exiting from the plurality of light extraction grating units 12 and a normal line is within a set range, and the normal line is perpendicular to a surface of the first base substrate 11. For example, the set range is (−5°, 5°), (−7°, 7°), (−10°, 10°), etc.).

In some embodiments, as shown in FIG. 1B, a driving signal is applied to the pixel electrode layer 14b through the pixel driving structure 14, so that there is a voltage between the pixel electrode layer 14b and the common electrode layer 14c. The voltage drives liquid crystal molecules in the liquid crystal layer 3 to rotate, so that the liquid crystal layer 3 forms a liquid crystal grating. By utilizing diffraction effect of the liquid crystal grating on the light, the light is projected to the filter layer 23, and then exits from the filter layer 23. In this case, the liquid crystal display apparatus 100 is in a bright state. By controlling the magnitude of the voltage applied onto the liquid crystal layer 3, the diffraction efficiency of the liquid crystal grating to the light is changed, thereby changing the intensity of the light passing through the filter layer 23, and realizing the display of different gray scales.

In some other embodiments, as shown in FIG. 1A, the pixel driving structure 14 stops applying the driving signal to the pixel electrode layer 14b, and the pixel electrode layer 14b and the common electrode layer 14c stop applying the voltage to the liquid crystal layer 3. Therefore, the liquid crystal molecules in the liquid crystal layer 3 return to initial orientations, and collimated light exiting from the plurality of light extraction grating units 12 does not diffract when passing through the liquid crystal layer 3, but directly reaches the black matrix layer 22, and is blocked by the black matrix layer 22. In this case, the liquid crystal display apparatus 100 is in a dark state.

In the liquid crystal display apparatus 100, regions of the first base substrate 11 corresponding to the plurality of light extraction grating units 12 are light extraction opening regions A, and regions other than the light extraction opening regions A are non-light extraction opening regions B. Ideally, it is required that the light propagating in the first base substrate 11 by total reflection exits from the light extraction opening regions A through the plurality of light extraction grating units 12, but not from the non-light extraction opening regions B.

Figure 2A:
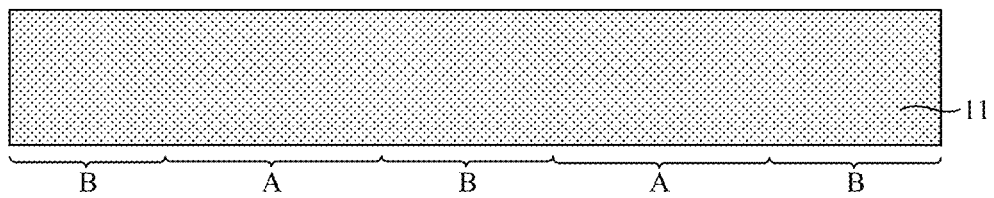
FIGS. 2A to 2C are schematic diagrams showing steps of a method of manufacturing a light guide substrate in the related art.
Figure 2B:
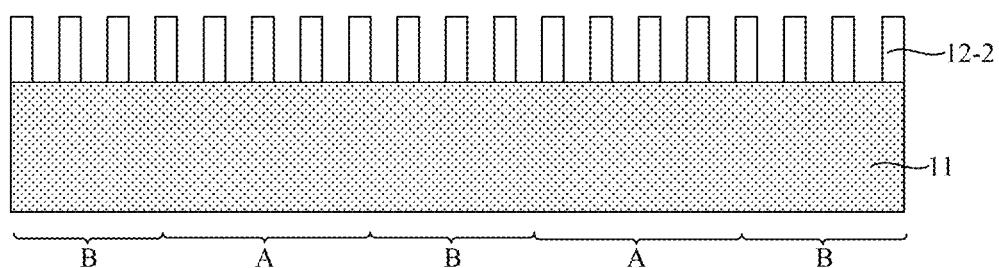
Figure 2C:
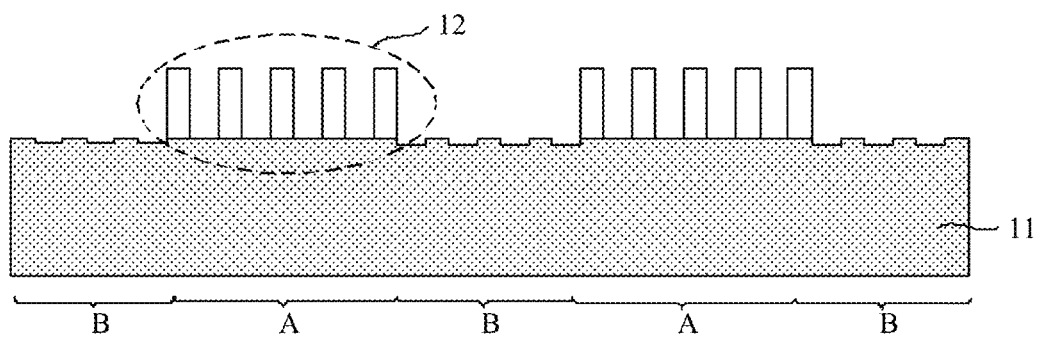

In the related art, during a process of manufacturing the light guide substrate 1 included in the liquid crystal display apparatus 100, the surface of the first base substrate 11 on which the plurality of light extraction grating units 12 are disposed is damaged, which results in a light leakage phenomenon occurring in the non-light extraction opening regions B of the first base substrate 11. With reference to FIGS. 2A to 2C, the manufacturing process in the related art is as follows.

As shown in FIG. 2A, the first base substrate 11 is provided. The first base substrate 11 includes a plurality of light extraction opening regions A and non-light extraction opening regions B other than the plurality of light extraction opening regions A.

As shown in FIG. 2B, a grating structure layer 12-2 is formed on a surface of the first base substrate 11.

As shown in FIG. 2C, portions of the grating structure layer 12-2 corresponding to the non-light extraction opening regions are removed, so as to obtain a plurality of light extraction grating units 12 in one-to-one correspondence with the plurality of light extraction opening regions.

An etching process is usually used to remove the portions of the grating structure layer 12-2 corresponding to the non-light extraction opening regions B. During the process of etching the portions of the grating structure layer 12-2 corresponding to the non-light extraction opening regions B, a part of the surface of the first base substrate 11 in the non-light extraction opening regions B that is not covered by the grating structure layer 12-2 is simultaneously etched, which makes the non-light extraction opening regions B of the first base substrate 11 have a plurality of depressions, and have a grating-shaped structure. In this way, a part of light may exit from the non-light extraction opening regions B of the first base substrate 11, resulting in serious light leakage, and affecting a display effect of the liquid crystal display apparatus.

Inventors of the present disclosure have tested that, a light leakage rate of regions of the light guide substrate 1, which is manufactured by using the above manufacturing process, corresponding to the non-light extraction opening regions B (i.e., a ratio of the amount of light exiting from the regions of the light guide substrate 1 corresponding to the non-light extraction opening regions B to the total amount of the light transmitted in the first base substrate 11) is 13%.

Figure 3A:
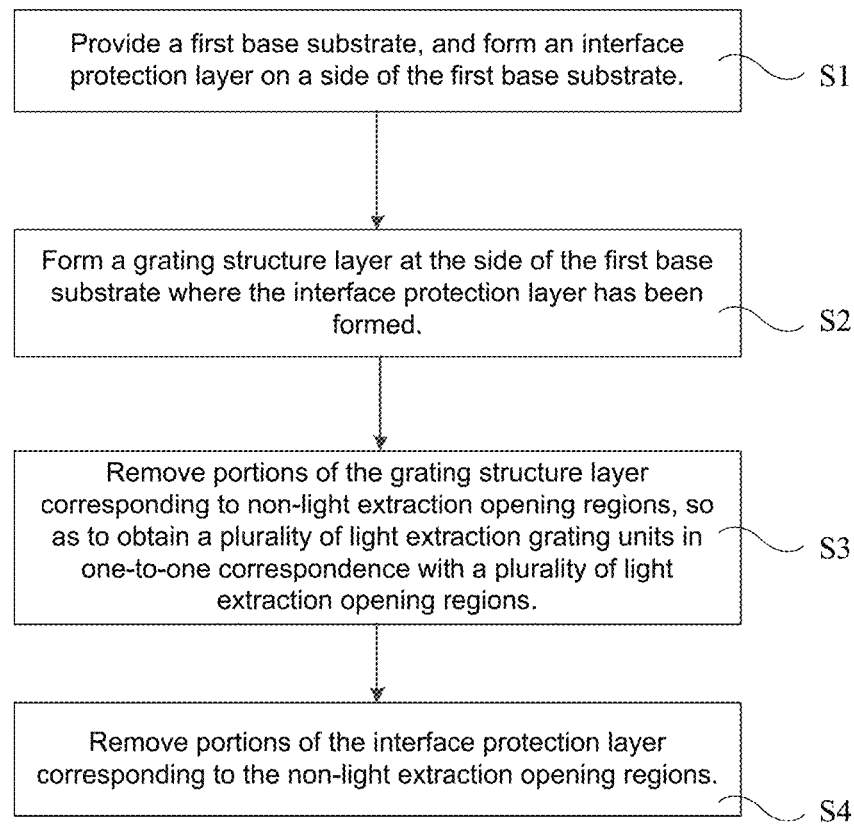
FIG. 3A is a flow diagram of a method of manufacturing a light guide substrate, in accordance with some embodiments of the present disclosure.

On this basis, some embodiments of the present disclosure provide a method of manufacturing a light guide substrate. As shown in FIG. 3A, the method of manufacturing the light guide substrate includes the following steps.

Figure 4A:
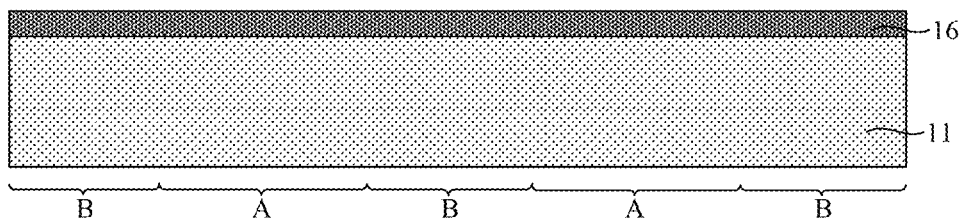
FIGS. 4A to 4H are schematic diagrams showing steps of a method of manufacturing a light guide substrate, in accordance with some embodiments of the present disclosure.

S1: as shown in FIG. 4A, the first base substrate 11 is provided, and an interface protection layer 16 is formed on a surface of the first base substrate 11. The first base substrate 11 includes a plurality of light extraction opening regions A and non-light extraction opening regions B other than the plurality of light extraction opening regions A.

In the above step, for example, the first base substrate 11 is a substrate having a light guide function, such as a glass substrate, or an acrylic plate.

Figure 4B:
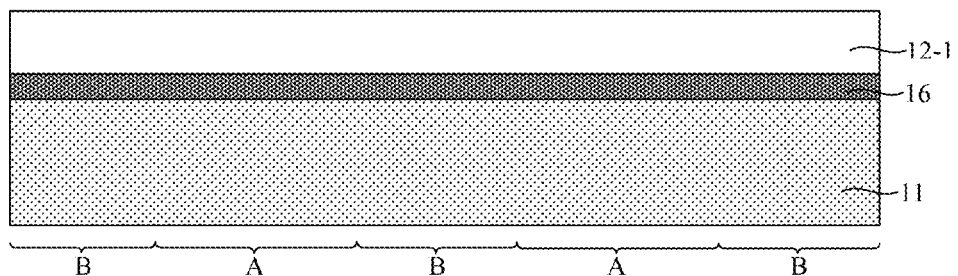
Figure 4C:
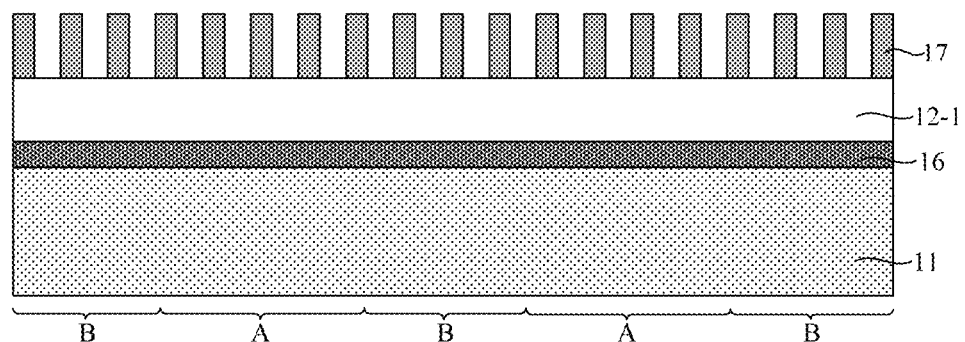
Figure 4D:
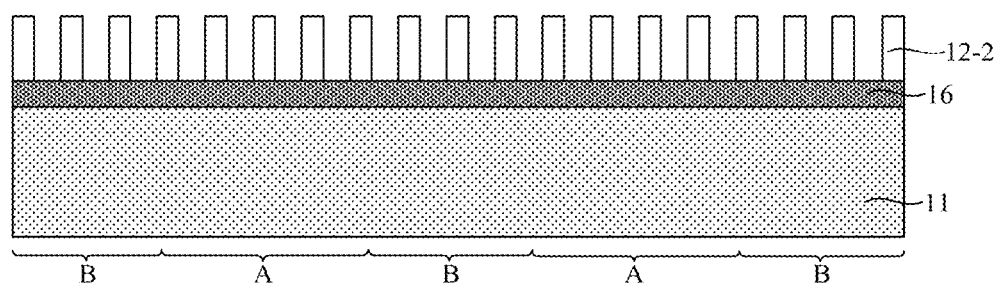

S2: as shown in FIG. 4D, the grating structure layer 12-2 is formed at a side of the first base substrate 11 where the interface protection layer 16 has been formed.

Figure 4E:
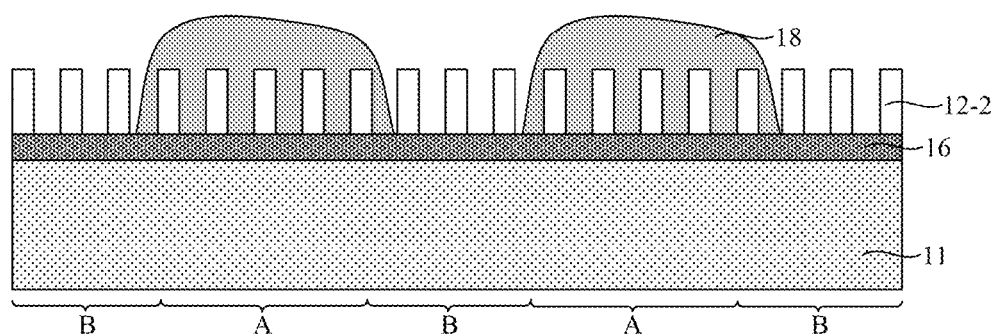
Figure 4F:
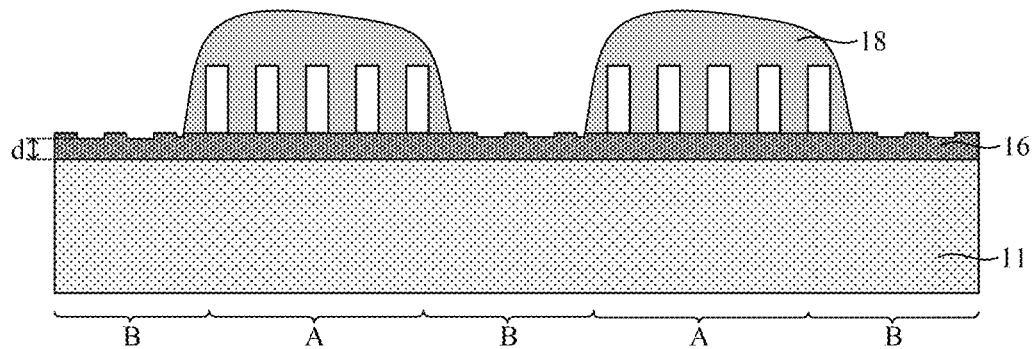
Figure 4G:
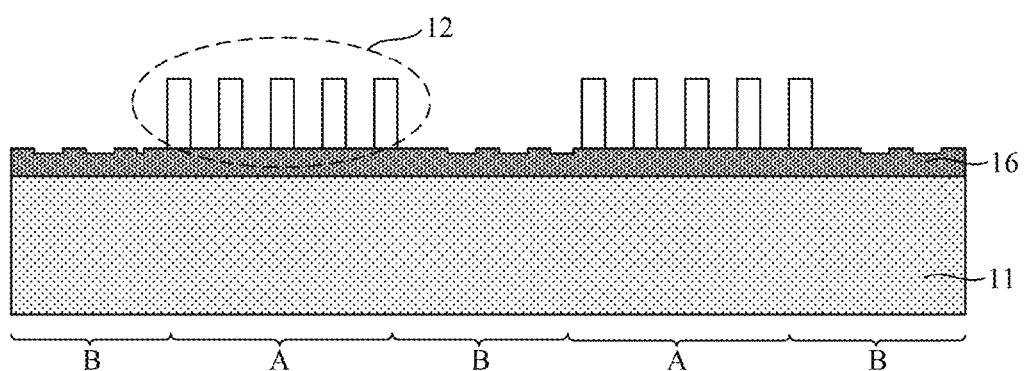

S3: as shown in FIG. 4G, portions of the grating structure layer 12-2 corresponding to the non-light extraction opening regions are removed, so as to obtain a plurality of light extraction grating units 12 in one-to-one correspondence with the plurality of light extraction opening regions A.

Figure 4H:
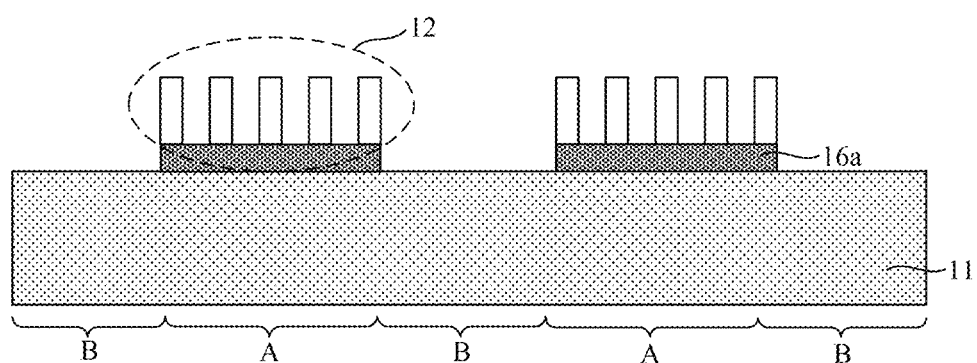

S4: as shown in FIG. 4H, portions of the interface protection layer 16 corresponding to the non-light extraction opening regions B are removed.

By using the above method of manufacturing the light guide substrate, the interface protection layer 16 is formed on the surface of the first base substrate 11, and then the grating structure layer 12-2 is formed at the side where the interface protection layer 16 has been formed. In this case, in a process of removing the portions of the grating structure layer 12-2 corresponding to the non-light extraction opening regions B, since the interface protection layer 16 covers the first base substrate 11, and protects the first base substrate 11, it is possible to avoid damage to the part of the surface of the first base substrate 11 corresponding to the non-light extraction opening regions B. Therefore, the part of the surface of the first base substrate 11 corresponding to the non-light extraction opening regions B are smooth, and the light leakage phenomenon in the non-light extraction opening regions B of the first base substrate 11 may be reduced. As a result, more light may exit from the plurality of light extraction grating units 12 in the plurality of light extraction opening regions A at a collimation angle, and the light extraction effect of the light guide substrate is improved.

Figure 3B:
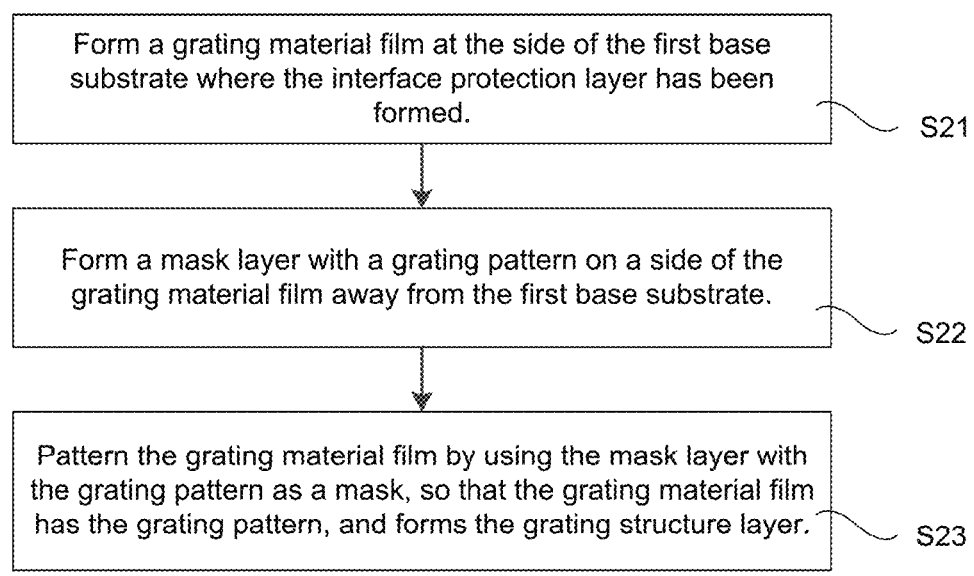
FIG. 3B is a flow diagram of another method of manufacturing a light guide substrate, in accordance with some embodiments of the present disclosure.

In some embodiments, as shown in FIG. 3B, the S2: forming the grating structure layer 12-2 at the side of the first base substrate 11 where the interface protection layer 16 has been formed, includes the following steps.

S21: as shown in FIG. 4B, a grating material film 12-1 is formed at the side of the first base substrate 11 where the interface protection layer 16 has been formed.

S22: as shown in FIG. 4C, a mask layer 17 with a grating pattern is formed on a side of the grating material film 12-1 away from the first base substrate 11.

In some examples, the mask layer 17 with the grating pattern is manufactured by using a nanometer imprint process. During the manufacturing process, an imprint resist with the grating pattern is used as the required mask layer 17 to be imprinted on a surface of the grating material film 12-1. The mask layer 17 with the grating pattern manufactured through the nanometer imprint process has high preparation precision, which is beneficial to improve the precision of the grating structure layer 12-2 manufactured in the subsequent process. In some other examples, the mask layer 17 with the grating pattern is formed through a photoetching process. During the manufacturing process, the mask layer 17 with the grating pattern is manufactured through steps of coating photoresist, exposuring, and developing.

S23: as shown in FIG. 4D, the grating material film 12-1 is patterned by using the mask layer 17 with the grating pattern as a mask, so that the grating material film 12-1 has the grating pattern, and forms the grating structure layer 12-2.

Figure 3C:
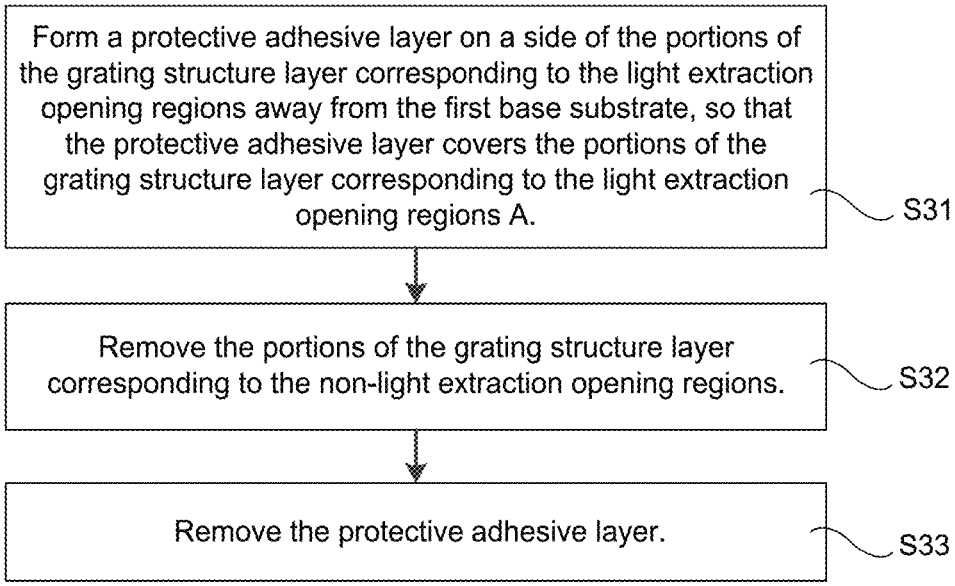
FIG. 3C is a flow diagram of yet another method of manufacturing a light guide substrate, in accordance with some embodiments of the present disclosure.

In some embodiments, as shown in FIG. 3C, S3 includes the following steps.

S31: as shown in FIG. 4E, a protective adhesive layer 18 is formed on a side of the portions of the grating structure layer 12-2 corresponding to the light extraction opening regions A away from the first base substrate 11, so that the protective adhesive layer 18 covers the portions of the grating structure layer 12-2 corresponding to the light extraction opening regions A.

S32: as shown in FIG. 4F, the portions of the grating structure layer 12-2 corresponding to the non-light extraction opening regions B are removed.

In some embodiments, in the S32, a dry etching process is used to remove the corresponding portions of the grating structure layer 12-2.

In a case where the dry etching is used to etch the grating structure layer 12-2, by controlling etching selectivity of the grating structure layer 12-2 to the interface protection layer 16, damages to the interface protection layer 16 may be reduced while the portions of the grating structure layer 12-2 corresponding to the non-light extraction opening regions B are effectively removed, thereby effectively protecting the first base substrate 11.

S33: as shown in FIG. 4G, the protective adhesive layer 18 is removed.

In the S33, for example, the manner of removing the protective adhesive layer 18 may be a stripping manner. That is, the protective adhesive layer 18 is stripped from the grating structure layer 12-2. In this way, it is possible to reduce impacts on the grating structure layer 12-2 during the operation process.

In the above embodiments, by forming the protective adhesive layer 18, the protective adhesive layer 18 covers the portions of the grating structure layer 12-2 corresponding to the light extraction opening regions A. In a process of removing the portions of the grating structure layer 12-2 corresponding to the non-light extraction opening regions B, the protective adhesive layer 18 protects the portions of the grating structure layer 12-2 corresponding to the light extraction opening regions A, so that the portions of the grating structure layer 12-2 corresponding to the light extraction opening regions A are not affected by etching. Moreover, at the end, the protective adhesive layer 18 is removed, and the portions of the grating structure layer 12-2 corresponding to the light extraction opening regions A are remained, so as to obtain the plurality of light extraction grating units 12 in one-to-one correspondence with the plurality of light extraction opening regions A.

Figure 5:
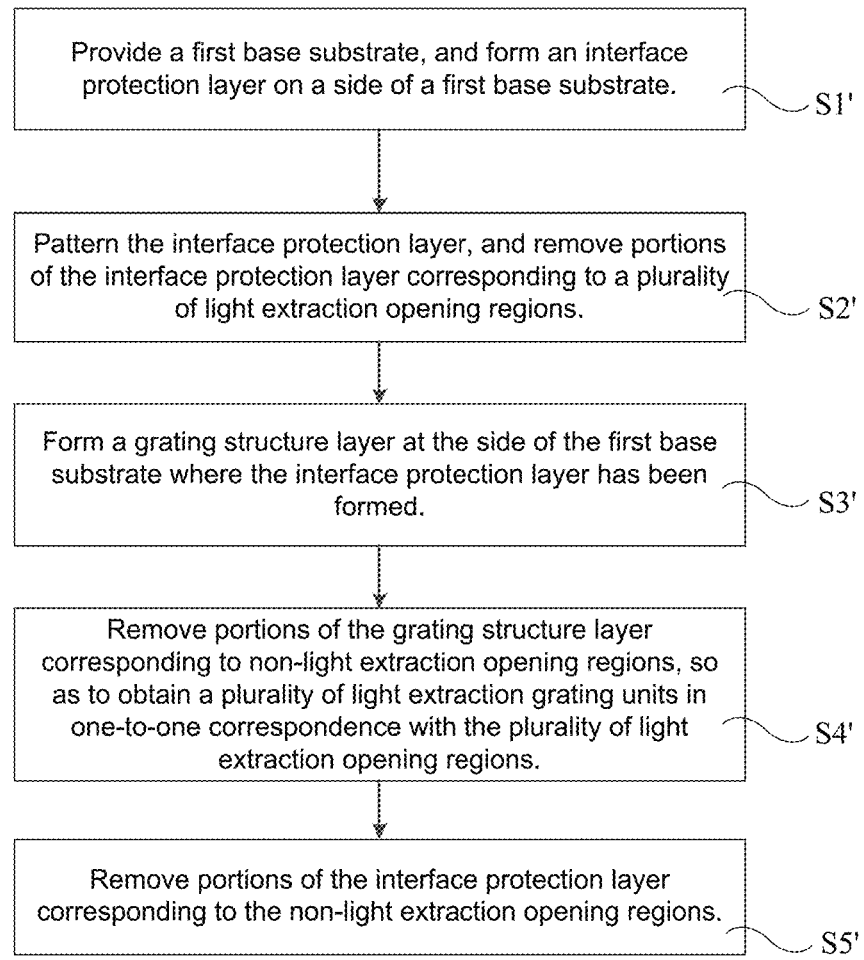
FIG. 5 is a flow diagram of yet another method of manufacturing a light guide substrate, in accordance with some embodiments of the present disclosure.

In some other embodiments, as shown in FIG. 5, some embodiments of the present disclosure provide another method of manufacturing the light guide substrate. The method includes the following steps.

Figure 6A:
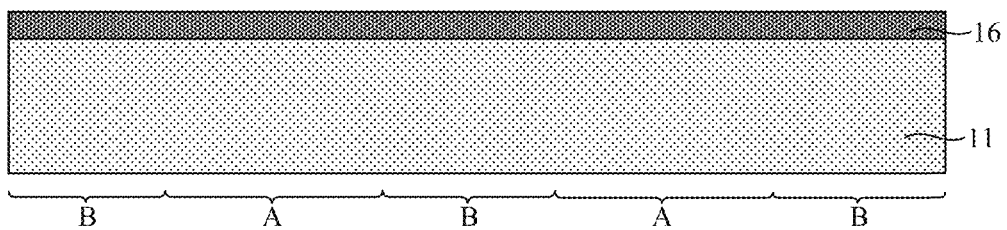
FIGS. 6A to 6I are schematic diagrams showing steps of another method of manufacturing a light guide substrate, in accordance with some embodiments of the present disclosure.

S1': as shown in FIG. 6A, the first base substrate 11 is provided, and the interface protection layer 16 is formed on a side of the first base substrate 11. The first base substrate 11 includes a plurality of light extraction opening regions A and a non-light extraction opening regions B other than the plurality of light extraction opening regions A.

Figure 6B:
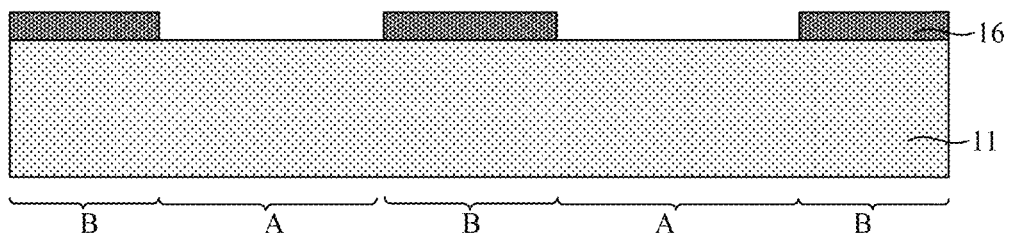

S2': as shown in FIG. 6B, the interface protection layer 16 is patterned, and portions of the interface protection layer 16 corresponding to the plurality of light extraction opening regions are removed.

Figure 6C:
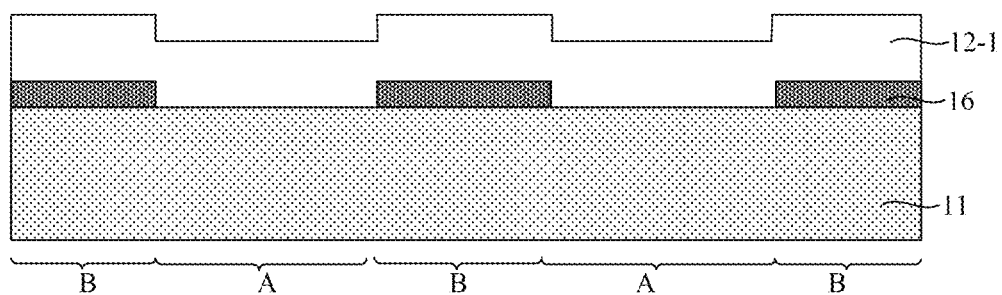
Figure 6D:
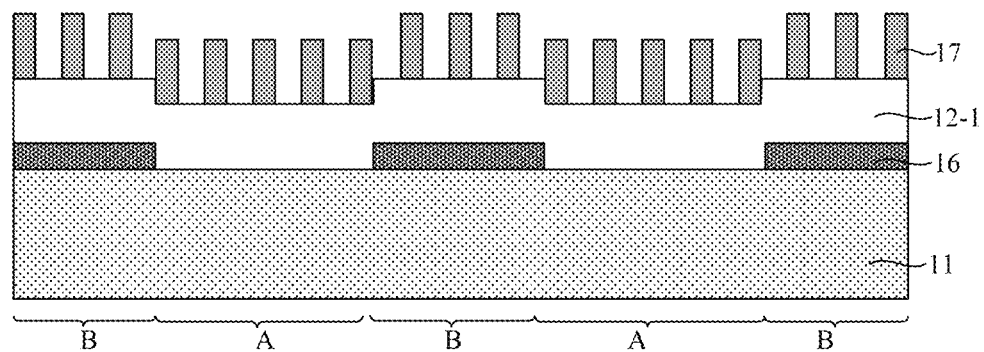
Figure 6E:
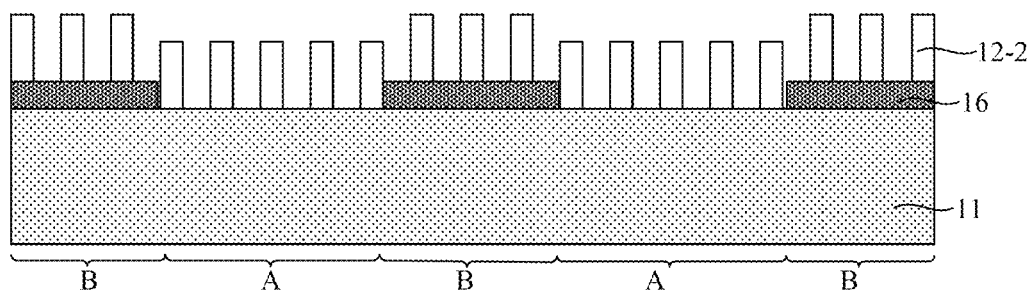

S3': as shown in FIG. 6E, the grating structure layer 12-2 is formed at the side of the first base substrate 11 where the interface protection layer 16 has been formed.

Figure 6F:
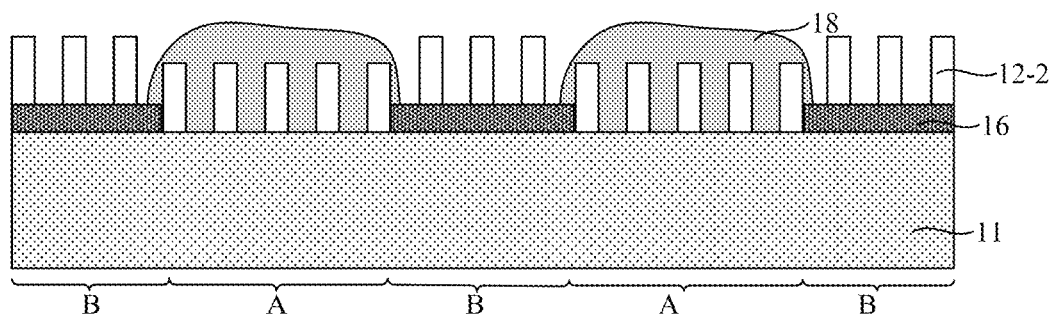
Figure 6G:
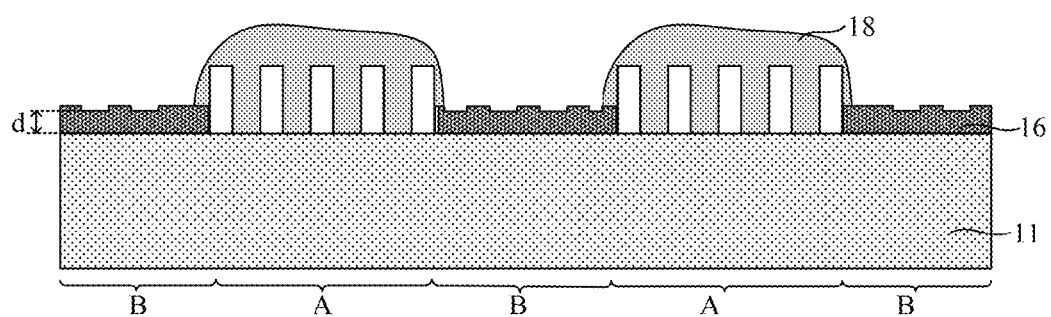
Figure 6H:
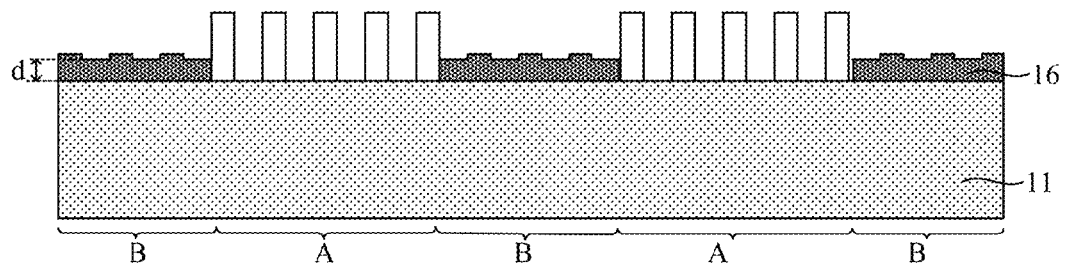

S4': as shown in FIG. 6H, portions of the grating structure layer 12-2 corresponding to the non-light extraction opening regions are removed, so as to obtain the plurality of light extraction grating units 12 in one-to-one correspondence with the plurality of light extraction opening regions A.

Figure 6I:
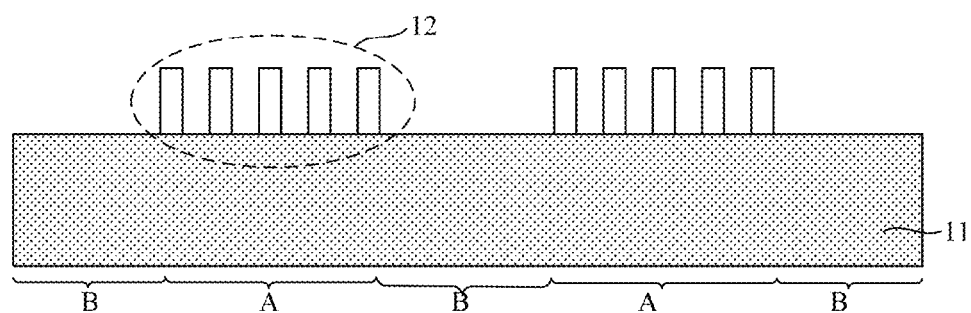

S5': as shown in FIG. 6I, portions of the interface protection layer 16 corresponding to the non-light extraction opening regions B are removed.

In the above embodiments, after the interface protection layer 16 is formed on a side of the first base substrate 11, the portions of the interface protection layer 16 corresponding to the plurality of light extraction opening regions A are removed, so that the grating structure layer 12-2 is directly formed on the surface of the first base substrate 11 in the light extraction opening regions A. It may prevent the interface protection layer 16 from affecting the amount of light exiting from the light extraction opening regions A, and the light exiting from the plurality of light extraction grating units 12 may be stronger.

In some embodiments, the S3': forming the grating structure layer 12-2 at the side of the first base substrate 11 where the interface protection layer 16 has been formed, includes the following steps.

S3'1: as shown in FIG. 6C, the grating material film 12-1 is formed at the side of the first base substrate 11 where the interface protection layer 16 has been formed.

S3'2: as shown in FIG. 6D, the mask layer 17 with the grating pattern is formed on a side of the grating material film 12-1 away from the first base substrate 11.

In some examples, the mask layer 17 with the grating pattern is manufactured by using the nanometer imprint process, or formed by using the photoetching process. For details, reference may be made to the description of S22, which will not be repeated here.

S3'3: as shown in FIG. 6E, the grating material film 12-1 is patterned by using the mask layer 17 with the grating pattern as a mask, so that the grating material film 12-1 has the grating pattern, and forms the grating structure layer 12-2.

In some embodiments, the S4': removing the portions of the grating structure layer 12-2 corresponding to the non-light extraction opening regions to obtain the plurality of light extraction grating units 12 in one-to-one correspondence with the plurality of light extraction opening regions A, includes the following steps.

S4'1: as shown in FIG. 6F, the protective adhesive layer 18 is formed on a side of the portions of the grating structure layer 12-2 corresponding to the light extraction opening regions A away from the first base substrate 11, so that the protective adhesive layer 18 covers the portions of the grating structure layer 12-2 corresponding to the light extraction opening regions A.

S4'2: as shown in FIG. 6G, the portions of the grating structure layer 12-2 corresponding to the non-light extraction opening regions B are removed.

S4'3: as shown in FIG. 6H, the protective adhesive layer 18 is removed.

In the above embodiments, by forming the protective adhesive layer 18, the protective adhesive layer 18 covers the portions of the grating structure layer 12-2 corresponding to the light extraction opening regions A. In a process of removing the portions of the grating structure layer 12-2 corresponding to the non-light extraction opening regions B, the protective adhesive layer 18 protects the portions of the grating structure layer 12-2 corresponding to the light extraction opening regions A, so that the portions of the grating structure layer 12-2 corresponding to the light extraction opening region A are not affected by etching, etc. Moreover, at the end, the protective adhesive layer 18 is removed, and the portions of the grating structure layer 12-2 corresponding to the light extraction opening regions A are remained, so as to obtain the plurality of light extraction grating units 12 in one-to-one correspondence with the plurality of light extraction opening regions A.

In some embodiments, as shown in FIGS. 4F and 6G, in the step of removing the portions of the grating structure layer 12-2 corresponding to the non-light extraction opening regions B, when the portions of the grating structure layer 12-2 corresponding to the non-light extraction opening regions B are completely removed, in the portions of the interface protection layer 16 corresponding to the non-light extraction opening region, a thickness d of the part thereof that is not covered by the grating structure layer is greater than or equal to 0.

In the above step, when the portions of the grating structure layer 12-2 corresponding to the non-light extraction opening regions B are removed, in the portions of the interface protection layer 16 corresponding to the non-light extraction opening regions B, the part that is not covered by the grating structure layer 12-2 may also be slightly etched. When the portions of the grating structure layer 12-2 corresponding to the non-light extraction opening regions B are completely removed, the thickness d of the part of the interface protection layer 16 that is not covered by the grating structure layer 12-2 is greater than or equal to 0. That is, in this case, the surface of the first base substrate 11 corresponding to the non-light extraction opening regions B is covered by the interface protection layer 16, which ensures that the surface of the first base substrate 11 will not be etched.

In some embodiments, as shown in FIGS. 4F and 6G, the etching process is used to remove the portions of the grating structure layer corresponding to the non-light extraction opening regions. In the step of removing the portions of the grating structure layer corresponding to the non-light extraction opening regions, etching selectivity of etching the material of the grating structure layer to etching the material of the interface protection layer is greater than or equal to 10.

The etching selectivity is a ratio of an etching rate of an etched material to an etching rate of another material. Therefore, the larger a value of the etching selectivity of etching the material of the grating structure layer 12-2 to etching the material of the interface protection layer 16 is, the larger a difference between an etching rate of etching the grating structure layer 12-2 and an etching rate of etching the interface protection layer 16 is, when the grating structure layer 12-2 and the interface protection layer 16 are etched simultaneously. By setting the etching selectivity of the material of the grating structure layer 12-2 to the material of the interface protection layer 16 to be greater than or equal to 10, the etching rate of the grating structure layer 12-2 may be ensured to be greater than the etching rate of the interface protection layer 16. In this case, when the portions of the grating structure layer 12-2 corresponding to the non-light extraction opening regions B are completely removed, in the portions of the interface protection layer 16 corresponding to the non-light extraction opening regions B, the thickness of the part thereof that is not covered by the grating structure layer 12-2 is greater than or equal to 0, so as to ensure that the interface protection layer 16 protects the surface of the first base substrate 11.

In some embodiments, referring to FIG. 6B, in the step of patterning the interface protection layer 16 to remove the portions of the interface protection layer 16 corresponding to the plurality of light extraction opening regions A, a wet etching process is used to remove the corresponding portions of the interface protection layer 16. In some other embodiments, referring to FIGS. 4H and 6I, in the steps of removing the portions of the interface protection layer 16 corresponding to the non-light extraction opening regions B, the wet etching process is used to remove the corresponding portions of the interface protection layer 16.

In the above embodiments, in a case where the wet etching process is used to remove the interface protection layer 16, there is a need to use an etching solution to corrode the interface protection layer 16. The etching solution that has no affect on the surface of the first base substrate 11 is selected, so that the surface of the first base substrate 11 will not be etched when the interface protection layer 16 is removed, which ensures the flatness of the surface of the first base substrate 11. Moreover, the wet etching process is simple, and the production efficiency is high.

For example, in a case where the first base substrate 11 is a glass substrate, the etching solution for etching the interface protection layer 16 through wet etching is an acid-based etching solution that will not chemically etch the glass substrate.

In some embodiments, the material of the interface protection layer 16 is metal, metal alloy, metal oxide, etc. For example, the material of the interface protection layer 16 is metal, such as aluminum, or copper. Or, the material of the interface protection layer 16 is metal alloy, such as aluminum neodymium (AlNd) alloy. Or, the material of the interface protection layer 16 is metal oxide, such as indium tin oxide (ITO), indium gallium zinc oxide (IGZO), or indium zinc oxide (IZO).

In the above embodiments, a material such as metal, metal alloy, or metal oxide is selected as the material of the interface protection layer 16, so that the etching selectivity of the material of the grating structure layer 12-2 to the material of the interface protection layer 16 is relatively high. Therefore, when the grating structure layer 12-2 is etched, a degree of etching the interface protection layer 16 may be reduced, and the first base substrate 11 may be effectively protected.

In some examples, the material of the grating structure layer is silicon nitride, the material of the interface protection layer is IGZO, and the etching selectivity of silicon nitride to IGZO is approximately 50:1. In a case where the grating structure layer 12-2 and the interface protection layer 16 are etched simultaneously, the interface protection layer 16 is only slightly etched, thereby ensuring that the surface of the first base substrate 11 is not etched.

As a possible design, in the method of manufacturing the light guide substrate provided by the present disclosure, in a case where the first base substrate 11 is a glass substrate, and the material of the interface protection layer 16 is IGZO, the wet etching process is used to remove the corresponding portions of the interface protection layer 16, and the etching solution for etching the interface protection layer 16 through wet etching is an acid-based etching solution. For example, components of the acid-based etching solution is: sulfuric acid, nitric acid, additive and water, and a volume ratio of these components is that: sulfuric acid:nitric acid:additive:water is equal to 8:4.5:2:76. In this case, in a case where the acid-based etching solution is used to remove the corresponding portions of the interface protection layer 16, the first base substrate 11 will not be chemically etched, and flatness of the portions of the surface of the first base substrate 11 that corresponds to the non-light extraction opening regions B is good, thereby effectively reducing light leakage.

The inventors of the present disclosure have tested that the light leakage rate of the regions of the light guide substrate (which is manufactured by the method of manufacturing the light guide substrate provided by the present disclosure) corresponding to the non-light extraction opening regions B (i.e., the ratio of the amount of light exiting from the regions of the light guide substrate 1 corresponding to the non-light extraction opening regions B to the total amount of light transmitted in the first base substrate 11) is 0.8%. It can be seen that the light leakage of the light guide substrate manufactured by the above manufacturing method is greatly reduced.

Figure 7:
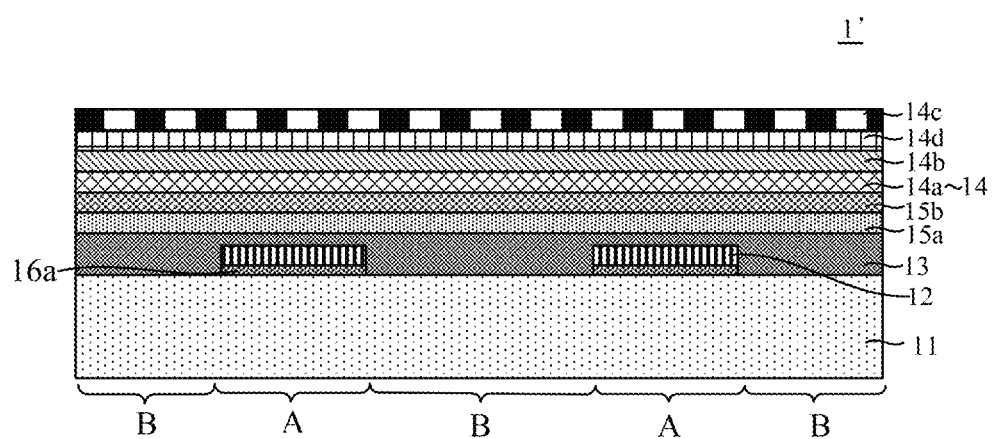
FIG. 7 is a schematic diagram of a light guide substrate, in accordance with some embodiments of the present disclosure.

Some embodiments of the present disclosure provide a light guide substrate 1'. As shown in FIG. 7, the light guide substrate 1' includes: a first base substrate 11, a plurality of interface protection structures 16a, and a plurality of light extraction grating units 12.

The first base substrate 11 includes a plurality of light extraction opening regions A and non-light extraction opening regions B other than the plurality of light extraction opening regions A.

In the above light guide substrate 1', at least a part of light emitted by the light source 4 disposed at a side face of the light guide substrate 1' is able to enter the inside of the first base substrate 11 from the side face of the first base substrate 11, and be totally reflected inside the first base substrate 11, so that the light is able to propagate from an end of the light guide substrate 1' near the light source to an end of the light guide substrate 1' far away from the light source. In some embodiments, the material of the first base substrate 11 is any one of glass, polymethyl methacrylate, acrylic sheet, etc. that can transmit light and totally reflect light.

The plurality of interface protection structures 16a are disposed on a side of the first base substrate 11, and the plurality of interface protection structures 16a are in one-to-one correspondence with the plurality of light extraction opening regions A. The "one-to-one correspondence" herein means that the number of the plurality of interface protection structures 16a is the same as the number of the plurality of light extraction opening regions A. Orthographic projections of the plurality of interface protection structures 16a on the first base substrate 11 substantially coincide with regions of the surface of the first base substrate 11 corresponding to the plurality of light extraction opening regions A. The substantial coincidence means that the overlapping area is more than 80% (e.g., 80%, 85%, 90%, and 95%) of an area of the light extraction opening region A.

The plurality of light extraction grating units 12 are arranged on a side of the plurality of interface protection structures 16a away from the first base substrate 11, and the plurality of light extraction grating units 12 are in one-to-one correspondence with the plurality of interface protection structures 16a.

The plurality of light extraction grating units 12 are configured to couple the light propagating in the first base substrate 11 and make the light exit at a collimation angle. The mentioned "collimation angle" means that an angle between the light exiting from the plurality of light extraction grating units 12 and a normal line is within a set range. The normal line is perpendicular to the surface of the first base substrate 11. For example, the set range is (−5°, 5°), (−7°, 7°), (−10°, 10°), etc.

The light guide substrate 1' includes the plurality of interface protection structures 16a in one-to-one correspondence with the plurality of light extraction grating units 12. That is, the light guide substrate 1' is manufactured by using the method of manufacturing the light guide substrate provided by the present disclosure. The manufacturing process is that the interface protection layer 16 is formed on the surface of the first base substrate 11, and the portions of the interface protection layer 16 corresponding to the non-light extraction opening regions B are removed, so as to obtain the plurality of interface protection structures 16a. Under the action of the interface protection layer 16, the portions of the surface of the first base substrate 11 corresponding to the non-light extraction opening regions B will not be damaged, thereby reducing occurrence of the light leakage phenomenon in the non-light extraction opening regions B of the first base substrate 11. Therefore, more light is ensured to exit from the plurality of light extraction grating units 12 in the plurality of light extraction opening regions A at a collimation angle, thereby improving the light extraction effect of the light guide substrate.

In some embodiments, as shown in FIG. 7, the light guide substrate 1' further includes a planarization layer 13 covering the plurality of light extraction grating units 12.

The inventors of the present disclosure have found through research that, if light propagating in the first base substrate 11 by total reflection is caused to exit from the plurality of light extraction opening regions A through the plurality of light extraction grating units 12 and not exit from the non-light extraction opening regions B, the planarization layer 13 covering the non-light extraction opening regions B is required to have a certain light locking ability. That is, the planarization layer 13 is required to enable light to be totally reflected on an interface where the first base substrate 11 is in contact with the planarization layer 13, without exiting from the surface of the first base substrate 11 facing the planarization layer 13. This requires that a refractive index of the planarization layer 13 is smaller than a refractive index of the first base substrate 11, and a thickness of the planarization layer 13 reaches a set thickness, so that in the non-light extraction opening regions B of the first base substrate 11, the light traveling to the interface where the first base substrate 11 is in contact with the planarization layer 13 can be totally reflected and will not exit from the non-light extraction opening regions B of the first base substrate 11.

However, in the related art, in a case where a material with a low refractive index is used for manufacturing the planarization layer 13, the thickness of the planarization layer 13 cannot reach the set thickness due to the limitation of characteristics of the material, which results in poor light locking ability of the planarization layer 13. For example, the refractive index of the first base substrate 11 is 1.5, and the refractive index of the planarization layer 13 is 1.25. With respect to the light propagating in the first base substrate 11, in a case where an incident angle of the light traveling to the interface where the first base substrate 11 is in contact with the planarization layer 13 is 65°, the thickness of the planarization layer 13 needs to be 900 nm, so as to effectively prevent the light from exiting. However, since the material with the low refractive index generally has low viscosity, when the planarization layer 13 is manufactured, the thickness thereof cannot reach the set thickness. The maximum thickness of the planarization layer 13 can only be approximately 825 nm, resulting in the poor light locking ability of the planarization layer 13. As a result, in the non-light extraction opening regions B of the first base substrate 11, a part of light will not be totally reflected in the first base substrate 11, but will pass through the portions of the first base substrate 11 corresponding to the non-light extraction opening regions B and the portions of the planarization layer 13 corresponding to the non-light extraction opening regions B to exit, which causes light leakage in the regions of the light guide substrate 1' corresponding to the non-light extraction opening regions B, and affects the display effect of the liquid crystal display apparatus using the light guide substrate 1'.

In some embodiments, as shown in FIG. 7, the light guide substrate 1' further includes a first buffer layer 15a and a second buffer layer 15b. The first buffer layer 15a is disposed on a side of the planarization layer 13 away from the first base substrate 11, and the second buffer layer 15b is disposed on a side of the first buffer layer 15a away from the first base substrate 11. A material of the first buffer layer 15a is different from a material of the second buffer layer 15b.

In the above embodiments, by providing the first buffer layer 15a and the second buffer layer 15b, materials of which are different, under joint action of the planarization layer 13, the first buffer layer 15a and the second buffer layer 15b, when the light propagating in the first base substrate 11 travels to the interface where the first base substrate 11 is in contact with the planarization layer 13, most of the light can be totally reflected, and be reflected back into the first base substrate 11, and another part of light that is not totally reflected passes through the planarization layer 13 and travels to an interface where the first buffer layer 15a is in contact with the planarization layer 13. Under the action of the first buffer layer 15a, most light in this part of light is reflected, and is reflected back into the first base substrate 11, while another part of this light passes through the first buffer layer 15a and travels to an interface where the second buffer layer 15b is in contact with the first buffer layer 15a, and can be reflected back into the first base substrate 11. In this case, the planarization layer 13, the first buffer layer 15a and the second buffer layer 15b constitute a multilayer reflective film, so that the light exiting from the non-light extraction opening regions B of the first base substrate 11 is reflected back into the first base substrate 11 without exiting the light guide substrate 1'. In this way, the light leakage in the regions of the light guide substrate 1' corresponding to the non-light extraction opening regions B is reduced.

In this way, in the light guide substrate 1' provided by the present disclosure, by providing the first buffer layer 15a and the second buffer layer 15b, with respect to the light propagating in the first base substrate 11, a part of light leaking from the non-light extraction opening regions B of the first base substrate 11 due to insufficient thickness of the planarization layer 13 can be reflected multiple times, and finally be reflected back into the first base substrate 11. This solves the problem of poor light locking ability caused by the insufficient thickness of the planarization layer 13. The first buffer layer 15a and the second buffer layer 15b are used to compensate for the thickness of the planarization layer 13. Compared with the planarization layer 13, the light locking ability of a laminated structure composed of the planarization layer 13, the first buffer layer 15a and the second buffer layer 15b is improved, and it is possible to avoid occurrence of light leakage phenomenon in the regions of the light guide substrate 1' corresponding to the non-light extraction opening regions B.

Further, since the light locking ability of the laminated structure composed of the planarization layer 13, the first buffer layer 15a and the second buffer layer 15b, relative to the light locking ability of the simple planarization layer 13, is improved, more light may exit at a collimation angle through the plurality of light extraction grating units 12, and a light utilization rate of the light guide substrate 1' is improved.

In some embodiments, a refractive index of the first buffer layer 15a is between the refractive index of the planarization layer 13 and a refractive index of the second buffer layer 15b.

In some embodiments, the material of the first buffer layer 15a is oxide, the material of the second buffer layer 15b is nitride, and the material of the first buffer layer 15a and the material of the second buffer layer 15b include the same element.

For example, the material of the first buffer layer is silicon oxide, and the material of the second buffer layer is silicon nitride.

In some examples, a thickness of the first buffer layer 15a and a thickness of the second buffer layer 15B is set by using the following manner:

1. First, the manufacturing process of the first base substrate 11, the plurality of light extraction grating units 12 and the planarization layer 13 of the light guide substrate 1' is completed.

2. Through testing, the correspondence relationship data between the thickness of the first buffer layer 15a manufactured on the surface of the planarization layer 13 facing away from the first base substrate 11 and a first light exiting amount is obtained. A thickness corresponding to the lowest first light exiting amount is selected from the correspondence relationship data as the thickness of the first buffer layer 15a in the light guide substrate 1' to be finally manufactured. The "first light exiting amount" herein refers to the amount of light that exits from the non-light extraction opening regions B of the first base substrate 11, passes through portions of the planarization layer and the first buffer layer 15a corresponding to the non-light extraction opening regions B, and exits from the side of the first buffer layer 15a away from the first base substrate 11. During the measurement, an incident angle of the light is a fixed value, such as 65 degrees.

For example, the thickness of the first buffer layer 15a is set to 100 nm, 200 nm, 300 nm, 400 nm, 500 nm, etc., and the first light exiting amount corresponding to the first buffer layer 15a at these thicknesses is tested respectively, so as to obtain a plurality of groups of the correspondence relationship data between the thickness of the first buffer layer 15a and the first light exiting amount. Further, a correspondence relationship curve between the thickness of the first buffer layer 15a and the first light exiting amount may be obtained according to the correspondence relationship data, and the thickness corresponding to the lowest first light exiting amount is selected as the thickness of the first buffer layer 15a.

3. The first buffer layer 15a is manufactured on the surface of the planarization layer 13 facing away from the first base substrate 11, and the thickness of the first buffer layer 15a is the selected thickness corresponding to the lowest first light exiting amount.

4. Through testing, the correspondence relationship data between the thickness of the second buffer layer 15b manufactured on the surface of the first buffer layer 15a facing away from the first base substrate 11 and a second light exiting amount is obtained. The thickness corresponding to the lowest second light exiting amount is selected from the correspondence relationship data as the thickness of the second buffer layer 15b in the light guide substrate 1' to be finally manufactured. The "second light exiting amount" herein refers to the amount of light that exits from the non-light extraction opening regions B of the first base substrate 11, passes through the portions of the planarization layer, the first buffer layer 15a and the second buffer layer 15b corresponding to the non-light extraction opening regions B, and exits from a side of the second buffer layer 15b away from the first base substrate 11. During the measurement, the incident angle of the light is the same as the above incident angle of light during the measurement of the correspondence relationship data of the thickness of the first buffer layer 15a and the first light exiting amount.

5. The second buffer layer 15b is manufactured on the surface of the first buffer layer 15a facing away from the first base substrate 11, and the thickness of the second buffer layer 15b is the selected thickness corresponding to the lowest second light exiting amount.

Through the above arrangement, the light locking ability of the first buffer layer 15a and the second buffer layer 15b may be better, and the light leakage of the light guide substrate 1' may be smaller.

Figure 8A:
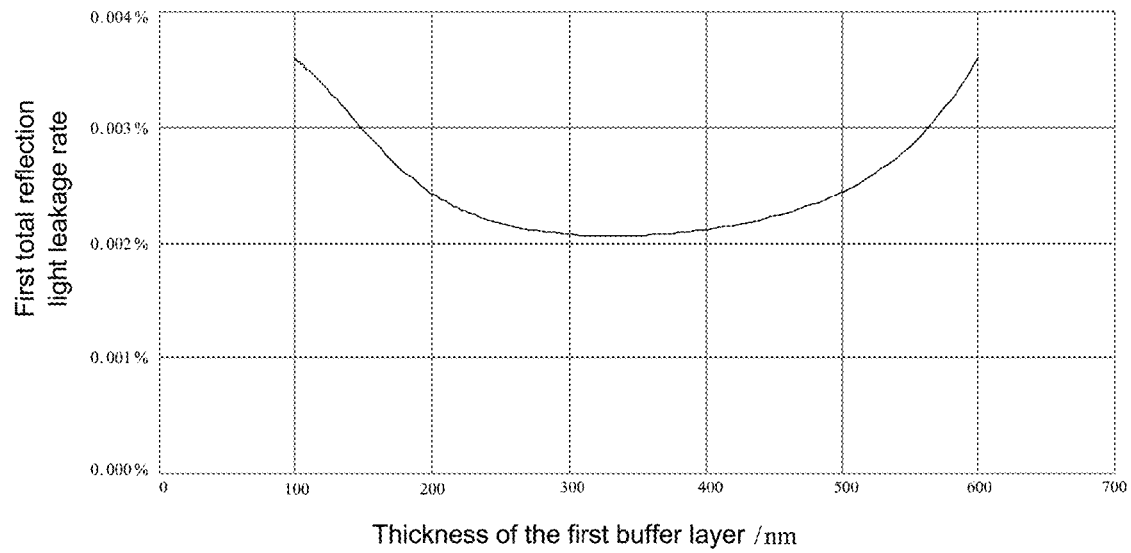
FIG. 8A is a graph showing a relationship between a thickness of a first buffer layer in a light guide substrate and a first total reflection light leakage rate, in accordance with some embodiments of the present disclosure.
Figure 8B:
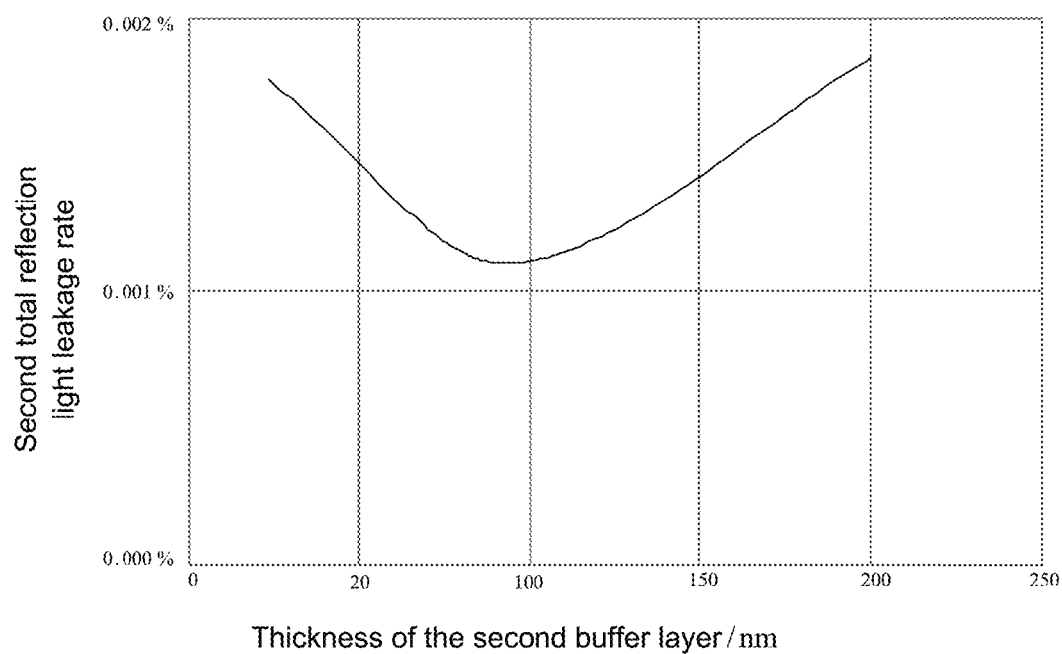
FIG. 8B is a graph showing a relationship between a thickness of a second buffer layer in a light guide substrate and a second total reflection light leakage rate, in accordance with some embodiments of the present disclosure.

For example, as shown in FIGS. 8A and 8B, the inventors of the present disclosure obtain a correspondence relationship curve between the thickness of the first buffer layer 15a and a first total reflection light leakage rate through simulation, and a correspondence relationship curve between the thickness of the second buffer layer 15b and a second total reflection light leakage rate, in a case where the material of the first buffer layer 15a is silicon oxide and the material of the second buffer layer 15b is silicon nitride.

As shown in FIG. 8A, with respect to the correspondence relationship curve between the thickness of the first buffer layer 15a and the first total reflection light leakage rate, the "first total reflection light leakage rate" refers to a ratio of the first light exiting amount to the total amount of the light transmitted in the first base substrate 11.

It can be seen from the correspondence relationship curve between the thickness of the first buffer layer 15a and the first total reflection light leakage rate that, in a case where the thickness of the first buffer layer 15a is approximately 300 nm, the first total reflection light leakage rate is the lowest. Therefore, the thickness of the first buffer layer 15a may be set to 300 nm.

As shown in FIG. 8B, in a case where the thickness of the first buffer layer 15a is 300 nm, the correspondence relationship curve between the thickness of the second buffer layer 15b and the second total reflection light leakage rate is obtained through simulation. Herein, the "second total reflection light leakage rate" refers to a ratio of the second light exiting amount to the total amount of the light transmitted in the first base substrate 11.

It can be seen from the correspondence relationship curve between the thickness of the second buffer layer 15b and the second total reflection light leakage rate that, in a case where the thickness of the second buffer layer 15b is approximately 100 nm, the second total reflection light leakage rate is the lowest. Therefore, the thickness of the second buffer layer 15b may be set to 100 nm.

Through the above simulations, it can be obtained that: in the case where the thickness of the first buffer layer 15a is 300 nm, and the thickness of the second buffer layer 15b is 100 nm, the second total reflection light leakage rate of the light guide substrate 1' is less than 0.1%. That is, the light locking ability of the laminated structure of the planarization layer 13, the first buffer layer 15a and the second buffer layer 15b may be controlled above 99.9%.

Moreover, since the light guide substrate 1' is provided with the first buffer layer 15a and the second buffer layer 15b, the light locking ability of the laminated structure of the planarization layer 13, the first buffer layer 15a and the second buffer layer 15b is improved, which is equivalent to compensating for the thickness of the planarization layer 13. Therefore, the thickness of the planarization layer 13 is reduced on the premise that the light locking ability of the laminated structure of the planarization layer 13, the first buffer layer 15a and the second buffer layer 15b does not decrease. For example, the thickness of the planarization layer 13 is 600 nm to 825 nm, e.g., 825 nm. In this way, when the planarization layer 13 is manufactured, since the thickness of the planarization layer 13 to be manufactured is reduced, the difficulty of the process of manufacturing the planarization layer 13 may be reduced.

In some embodiments, as shown in FIG. 7, the light guide substrate 1' further includes: the pixel driving structure 14, the pixel electrode layer 14b, the insulating layer 14d, and the common electrode layer 14c. The pixel driving structure 14 is disposed on a side of the second buffer layer 15b away from the first base substrate 11. The pixel electrode layer 14b is disposed on a side of the pixel driving structure 14 away from the first base substrate 11. The insulating layer 14d is disposed on a side of the pixel electrode layer 14b away from the first base substrate 11. The common electrode layer 14c is disposed on a side of the insulating layer 14d away from the first base substrate 11.

The pixel driving structure 14 includes a plurality of thin film transistors 14a, and the pixel electrode layer 14b includes a plurality of pixel electrodes. The plurality of thin film transistors 14a are configured to apply driving signals to the plurality of pixel electrodes respectively, so that there is a voltage between a plurality of pixel electrodes of the pixel electrode layer 14b and the common electrode layer 14c. The voltage drives the liquid crystal molecules in the liquid crystal layer of the liquid crystal display apparatus to rotate, so as to realize the display of the liquid crystal display apparatus.

Based on the above structure of the light guide substrate 1', in some embodiments, a density of the second buffer layer 15b of the light guide substrate 1' is higher than a density of the planarization layer 13, and is higher than a density of the first buffer layer 15a. Since the second buffer layer 15b has high density and good compactness, it can effectively prevent ions such as hydrogen ions and oxygen ions in the planarization layer 13 from penetrating into the plurality of thin film transistors 14a to affect performances thereof, which ensures that the plurality of thin film transistors 14a can operate normally without being affected. In a case where the material of the first buffer layer 15a is silicon nitride, the silicon nitride material has high density and good compactness, so that ion penetration may be more effectively prevented, which ensures normal operation of the plurality of thin film transistors 14a.

Figure 9:
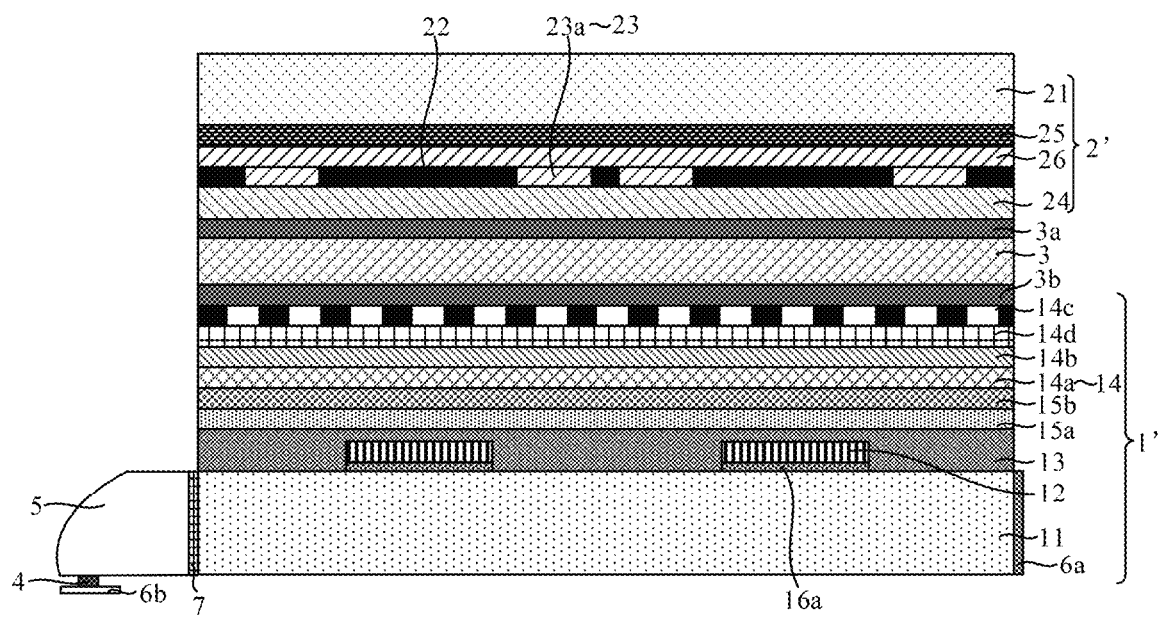
FIG. 9 is a schematic diagram of a liquid crystal display apparatus, in accordance with some embodiments of the present disclosure.

Some embodiments of the present disclosure provide a liquid crystal display apparatus 200. As shown in FIG. 9, the liquid crystal display apparatus 200 includes a light guide substrate 1' and an opposite substrate 2' disposed opposite to each other, and a liquid crystal layer 3 disposed between the light guide substrate 1' and the opposite substrate 2.

The light guide substrate 1' is the light guide substrate 1' provided by the above embodiments of the present disclosure. The specific structure of the light guide substrate 1' may refer to the related description in the above embodiments, which will not be repeated here.

The opposite substrate 2' includes a second base substrate 21 and a black matrix layer 22. The black matrix layer 22 is disposed at a side of the second base substrate 21 proximate to the light guide substrate 1'. The black matrix layer 22 has a plurality of openings, and the orthographic projections of the plurality of light extraction grating units 12 on the first base substrate 11 are within a range of the orthographic projection of the black matrix layer 22 on the first base substrate 11.

In some embodiments, the opposite substrate 2' further includes a filter layer 23, and the filter layer 23 includes a plurality of color filtering resists 23a. The plurality of color filtering resists 23a are disposed in the light exit regions formed by the plurality of openings of the black matrix layer.

The liquid crystal layer 3 is disposed between the light guide substrate 1' and the opposite substrate 2', and is configured to, under the action of the electric field, make the light exiting from the light guide substrate 1' reach the black matrix layer 22; or, make the light exiting from the light guide substrate 1' reach the light exit regions formed by the plurality of openings of the black matrix layer 22.

In some embodiments, the liquid crystal layer 3 forms a liquid crystal grating under the action of the electric field, and makes the light exiting from the light guide substrate 1' reach the light exit regions formed by the plurality of openings of the black matrix layer 22 by utilizing the diffraction effect of the liquid crystal grating, so that the liquid crystal display apparatus 200 realizes display.

In some other embodiments, the liquid crystal layer 3 forms one of a liquid crystal prism or a liquid crystal lens under the action of the electric field, and makes the light exiting from the light guide substrate 1' reach the light exit regions formed by the plurality of openings of the black matrix layer 22 by utilizing refraction effect of the liquid crystal prism or the liquid crystal lens, so that the liquid crystal display apparatus 200 realizes display.

In the manufacturing process of the light guide substrate 1' provided in the embodiments of the present disclosure, by providing the interface protection layer 16, the portions of the surface of the first base substrate 11 corresponding to the non-light extraction opening regions B will not be damaged, thereby reducing occurrence of the light leakage phenomenon in the non-light extraction opening regions B of the first base substrate 11. In addition, the laminated structure composed of the planarization layer 13, the first buffer layer 15a and the second buffer layer 15b has a strong light locking ability to the non-light extraction opening regions B of the first base substrate 11. Therefore, a probability of light exiting from the regions of the light guide substrate 1' corresponding to the plurality of non-light extraction grating units 12 is low, the amount of light leakage is low, and the light utilization rate is improved.

In this way, in a case where the liquid crystal display apparatus 200 is in a bright state, from the light guide substrate 1', more light travels to the light exit regions formed by the plurality of openings of the black matrix layer 22 through the liquid crystal layer 3. For example, there is more light reaching the plurality of color filtering resists 23a, so that the display effect is better.

In a case where the liquid crystal display apparatus 200 is in a dark state, light exits from the regions of the light guide substrate 1' corresponding to the plurality of light extraction grating units 12, and is absorbed by the black matrix layer 22, so as to realize the dark state. This reduces the leakage of light from the regions of the light guide substrate 1' corresponding to the non-light extraction opening regions B. The light travels to the light exit regions formed by the plurality of openings of the black matrix layer 22, such as, the plurality of color filtering resists 23a, which results in uneven display in the dark state.

In addition, the liquid crystal display apparatus 200 realizes display by using the liquid crystal layer 3 to change an exit direction of light under the action of the electric field, without arranging a polarizer. In this way, it is possible to improve a transmittance of the liquid crystal display apparatus 200, so that the liquid crystal display apparatus 200 is suitable for the field of transparent display technology with high requirement for transmittance. For example, the liquid crystal display apparatus 200 may be applied to an augmented reality (AR) device using a transparent display apparatus.

In some embodiments, as shown in FIG. 9, the liquid crystal display apparatus 200 further includes a first alignment layer 3a and a second alignment layer 3b that are disposed on both sides of the liquid crystal layer 3, and are configured to make a plurality of liquid crystal molecules included in the liquid crystal layer 3 arrange orderly according to a preset direction.

In some embodiments, as shown in FIG. 9, the liquid crystal display apparatus 200 further includes a light source 4 disposed at one end of the first base substrate 11 of the light guide substrate 1', and the light source 4 is configured to provide the liquid crystal display apparatus 200 with light required for display.

In some embodiments, with continued reference to FIG. 9, the liquid crystal display apparatus 200 further includes: a collimating lampshade 5 disposed at the end of the first base substrate 11 in the light guide substrate 1' where the light source 4 is disposed, and an adhesive layer 7 disposed between the collimating lampshade 5 and the first base substrate 11. The collimating lampshade 5 is disposed above or around the light source 4, and is configured to converge the light emitted by the light source 4 and couple the light to a side face of the first base substrate 11 proximate to the light source 4. The adhesive layer 7 is configured to fix the collimating lampshade 5 to the side face of the first base substrate 11 proximate to the light source 4.

As a possible design, the liquid crystal display apparatus 200 further includes: a first reflective sheet 6a disposed at an end of the first base substrate 11 away from the light source 4, and a second reflective sheet 6b disposed at a side face of the light source 4 facing away from the collimating lampshade 5. The first reflective sheet 6a and the second reflective sheet 6b have the function of reflecting light. The first reflective sheet 6a may reflect the light propagating to the end of the first base substrate away from the light source 4 back into the first base substrate 11, and the second reflective sheet 6b may reflect the light emitted from the light source 4 away from the collimating lampshade 5 to the collimating lampshade 5. In this way, it is possible to reduce light loss and improve the light utilization rate.

In some embodiments, as shown in FIG. 9, in the liquid crystal display apparatus 200, the opposite substrate 2' further includes an organic transmission layer 24 and a third buffer layer 25. The organic transmission layer 24 is disposed on a side of the black matrix layer 22 away from the second base substrate 21, and the third buffer layer 25 is disposed on a side of the black matrix layer proximate to the second base substrate 21. A direction of the internal stress of the third buffer layer 25 is opposite to a direction of the internal stress of the organic transmission layer 24.

Under the action of the electric field, the liquid crystal layer 3 makes the light exiting from the light guide substrate 1' pass through the organic transmission layer 24 and reach the light exit regions formed by the plurality of openings of the black matrix layer 22, so that the liquid crystal display apparatus 200 realizes display.

The inventors of the present disclosure have found through research that, the greater a distance between the liquid crystal layer 3 and the black matrix layer 22 is, the more light is projected to the light exit regions formed by the plurality of openings of the black matrix layer 22 when the liquid crystal layer 3 is subjected to the action of the electric field, and thereby the display brightness of the liquid crystal display apparatus 200 is higher. By providing the organic transmission layer 24 between the liquid crystal layer 3 and the black matrix layer 22, the distance between the liquid crystal layer 3 and the black matrix layer 22 may be increased, so that more light is projected to the light exit regions formed by the plurality of openings of the black matrix layer, and the display brightness of the liquid crystal display apparatus 200 is enhanced.

However, in a case where a thickness of the organic transmission layer 24 is high, the internal stress of the organic transmission layer 24 also increases accordingly. The organic transmission layer 24 is usually manufactured in a high temperature environment. After the organic transmission layer 24 is manufactured, the temperature of the organic transmission layer 24 will drop, and the organic transmission layer 24 will shrink greatly under the effect of internal stress. However, since the second base substrate 21 has to be closely attached to the black matrix layer 22 and the organic transmission layer 24, the second base substrate 21 will deform accordingly after the organic transmission layer 24 shrinks greatly, which causes the opposite substrate 2' to warp.

Figure 10:
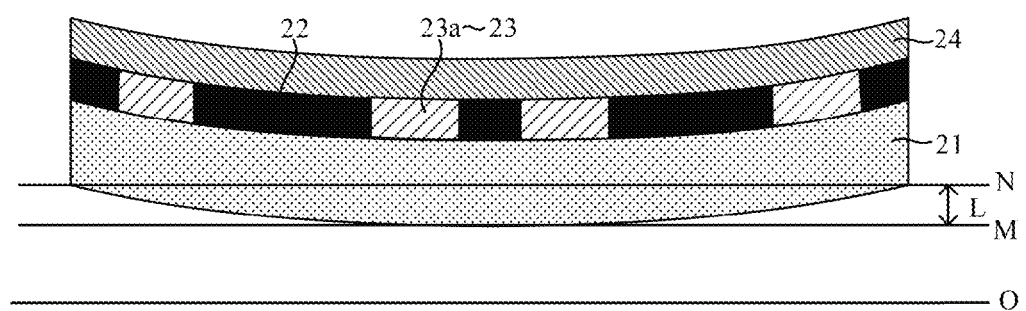
FIG. 10 is a schematic diagram showing warpage occurring in an opposite substrate in a liquid crystal display apparatus in the related art.

The inventors of the present disclosure have tested that, in a case where the third buffer layer 25 is not disposed in the opposite substrate 2', an amount of warpage of the opposite substrate 2' is 2.5 mm. Herein, as shown in FIG. 10, the amount of warpage refers to a vertical distance L between a plane M that is defined by a middle part of the opposite substrate 2' and is parallel to a reference plane O and a plane N that is defined by the warped portions at both ends of the opposite substrate 2' and is parallel to the reference plane O. The reference plane O is a plane defined by the opposite substrate 2' when it is not warped.

If the thickness of the organic transmission layer 24 is reduced, the improvement thereof to the display brightness of the liquid crystal display apparatus 200 will be weakened.

Therefore, in the opposite substrate 2' of the liquid crystal display apparatus 200 provided by the present disclosure, the third buffer layer 25 is disposed between the black matrix layer 22 and the second base substrate 21, and the direction of the internal stress of the third buffer layer 25 is opposite to the direction of the internal stress of the organic transmission layer 24. In this way, force of the third buffer layer 25 on the second base substrate 21 and the black matrix layer 22 offsets or partially offsets force of the organic transmission layer 24 on the black matrix layer 22, so that a degree of deformation of the second base substrate 21 is reduced, and a degree of warpage of the opposite substrate 2' is reduced.

In some embodiments, the material of the third buffer layer 25 is silicon nitride. In some embodiments, the manufacturing process of the third buffer layer 25 adopts a chemical vapor deposition process. When the third buffer layer 25 is manufactured, lattice parameters of the material of the third buffer layer 25 is adjusted, so that the formed second buffer layer 25 has the internal stress opposite to the internal stress of the organic transmission layer 24.

For example, in a case where the material of the second buffer layer 25 is silicon nitride, the chemical vapor deposition process is used to manufacture the second buffer layer 25. During the deposition process, monosilane ($SiH_4$) and ammonia gas ($NH_3$) are introduced into a reaction chamber, and the lattice parameters of the silicon nitride material are adjusted by adjusting $SiH_4$ gas content and $NH_3$ gas content, so as to form the third buffer layer 25 having the internal stress opposite to the internal stress of the organic transmission layer 24.

In some embodiments, two aspects need to be taken into consideration for the setting of the thickness of the organic transmission layer 24. On one hand, in the liquid crystal display apparatus 200, the greater the thickness of the organic transmission layer 24 is, the greater the distance between the liquid crystal layer 3 and the black matrix layer 22 is, which allows more light to reach the light exit regions formed by the plurality of openings of the black matrix layer 22 through the organic transmission layer 24. In this way, it is possible to increase the brightness of the liquid crystal display apparatus 200. On the other hand, the greater the thickness of the organic transmission layer 24 is, the higher the internal stress thereof is, which may cause the opposite substrate 2' to warp. Therefore, the thickness of the organic transmission layer 24 needs to be set within a reasonable range. For example, the thickness of the organic transmission layer 24 is 15 μm to 20 μm.

In some embodiments, in order to make the force of the third buffer layer 25 on the second base substrate 21 and the black matrix layer 22 better offset against the force of the organic transmission layer 24 on the black matrix layer 22 to effectively improve the warpage phenomenon of the opposite substrate 2', the third buffer layer 25 needs to have an appropriate thickness. For example, in a case where the material of the third buffer layer 25 is silicon nitride, the thickness of the third buffer layer 25 is 0.5 μm to 1 μm.

In some embodiments, with continued reference to FIG. 9, the opposite substrate 2' further includes a bonding layer 26 disposed between the black matrix layer 22 and the third buffer layer 25.

By providing the bonding layer 26 between the black matrix layer 22 and the third buffer layer 25, the bonding force between the black matrix layer 22 and the third buffer layer 25 may be enhanced, which prevents the second buffer layer 25 from peeling or peeling off due to unstable bonding when the black matrix layer 22 is in direct contact with the third buffer layer 25.

In some examples, the material of the bonding layer 26 is silicon dioxide. The silicon dioxide has strong adhesion and may enhance a bonding force between the bonding layer 26 and the second buffer layer 25.

In some embodiments, the inventors of the present disclosure have tested that, in a case where the thickness of the organic transmission layer 24 is 22 µm, the thickness of the third buffer layer 25 is 100 nm, and the thickness of the bonding layer 26 is 300 nm, the amount of warpage of the opposite substrate 2' is less than 0.1 mm. It can be seen that the warpage phenomenon of the opposite substrate 2' may be significantly improved by providing the third buffer layer 25.

Therefore, in the liquid crystal display apparatus 200 provided by the present disclosure, since the amount of warpage of the opposite substrate 2' is small, the flatness of the overall liquid crystal display apparatus 200 is high, and the product quality may be improved.

Figure 11:
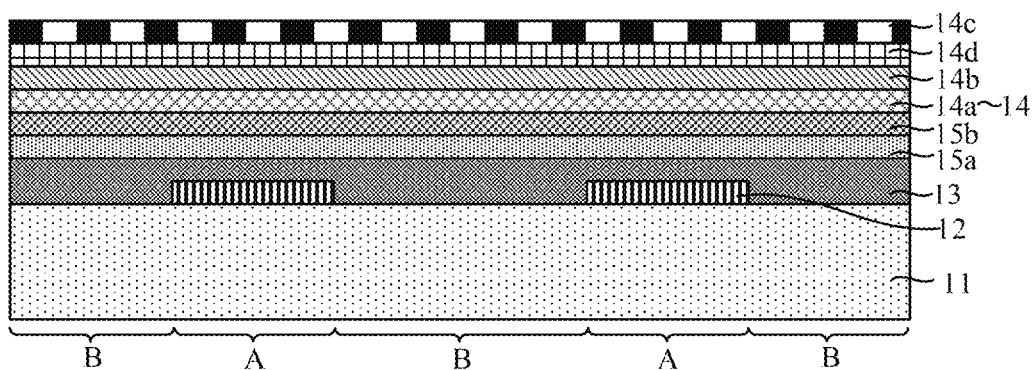
FIG. 11 is a schematic diagram of a light guide substrate, in accordance with some embodiments of the present disclosure.

As shown in FIG. 11, some embodiments of the present disclosure provide a light guide substrate 1".

(1) The light guide substrate 1" includes:
  a first base substrate 11;
  a plurality of light extraction grating units 12 disposed at a side of the first base substrate 11;
  a planarization layer 13 covering the plurality of light extraction grating units 12;
  a first buffer layer 15a disposed on a side of the planarization layer 13 away from the first base substrate 11; and
  a second buffer layer 15b disposed on a side of the first buffer layer 15a away from the first base substrate 11.

The material of the first buffer layer 15a is different from the material of the second buffer layer 15b.

(2) According to the light guide substrate 1" described in (1), the refractive index of the first buffer layer 15a is between the refractive index of the planarization layer 13 and the refractive index of the second buffer layer.

(3) According to the light guide substrate 1" described in (1), the material of the first buffer layer 15a is oxide, the material of the second buffer layer 15b is nitride, and the material of the first buffer layer and the material of the second buffer layer include the same element(s).

(4) According to the light guide substrate 1" described in (3), the material of the first buffer layer 15a is silicon oxide, and the material of the second buffer layer 15b is silicon nitride.

(5) According to the light guide substrate 1" described in (4), the thickness of the first buffer layer 15a is 0.3 µm, the thickness of the second buffer layer 15b is 0.1 µm, and the thickness of the planarization layer 13 is 0.825 µm.

(4) According to the light guide substrate 1" described in (1) to (5), the light guide substrate 1" further includes:
  a pixel driving structure 14 disposed on a side of the second buffer layer 15b away from the first base substrate 11, and the pixel driving structure 14 includes a plurality of thin film transistors 14a;
  a pixel electrode layer 14b disposed on a side of the pixel driving structure 14 away from the first base substrate 11; and
  a common electrode layer 14c disposed on a side of the pixel electrode layer 14b away from the first base substrate 11.

The density of the second buffer layer 15b is higher than the density of the planarization layer 13, and is higher than the density of the first buffer layer 15a.

In some embodiments, the light guide substrate 1" further includes an insulating layer 14d disposed between the pixel electrode layer 14b and the common electrode layer 14c.

Figure 12:
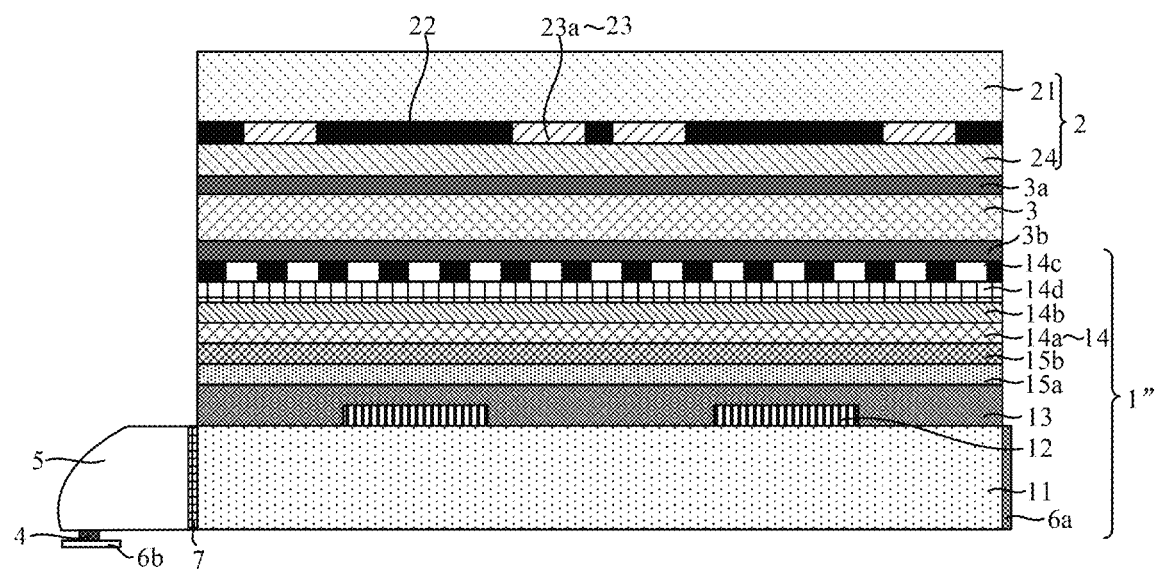
FIG. 12 is a schematic diagram of another liquid crystal display apparatus, in accordance with some embodiments of the present disclosure.

As shown in FIG. 12, some embodiments of the present disclosure provide a liquid crystal display apparatus 300. The liquid crystal display apparatus 300 includes the light guide substrate 1", an opposite substrate 2 and a liquid crystal layer 3.

The light guide substrate 1" is the light guide substrate 1" in the above embodiments.

The opposite substrate 2 is disposed opposite to the light guide substrate 1". The opposite substrate 2 includes:
  a second base substrate 21; and
  a black matrix layer 22 disposed on a side of the second base substrate 21 proximate to the light guide substrate 1".

The black matrix layer 22 has a plurality of openings, and the orthographic projections of the plurality of light extraction grating units 12 on the first base substrate 11 are within a range of the orthographic projection of the black matrix layer 22 on the first base substrate 11.

The liquid crystal layer is disposed between the light guide substrate 1" and the opposite substrate 2. The liquid crystal layer 3 is configured to, under the action of the electric field, make the light exiting from the light guide substrate 1" reach the black matrix layer 22; or, make the light exiting from the light guide substrate 1" reach the light exit regions formed by the plurality of openings of the black matrix layer 22.

The light guide substrate 1" included in the liquid crystal display apparatus 300 is provided with the first buffer layer 15a and the second buffer layer 15b, so that the light locking ability of the laminated structure composed of the planarization layer 13, the first buffer layer 15a and the second buffer layer 15b is improved, so that the light leakage of the light guide substrate 1" is low, and the light utilization rate is high. In this way, when the liquid crystal display apparatus 300 is in a dark state, the uneven display phenomenon in the dark state is reduced, and when the liquid crystal display apparatus 300 is in a bright state, the display brightness is improved.

In some embodiments, with continued reference to FIG. 12, the liquid crystal display apparatus 300 further includes a first alignment layer 3a, a second alignment layer 3b, a light source 4, a collimating lampshade 5, an adhesive layer 7, a first reflective sheet 6a and a second reflective sheet 6b. With respect to the structures, arrangement manners and functions of the above components, reference may be made to the description of the relevant contents of the liquid crystal display apparatus 200.

Figure 13:
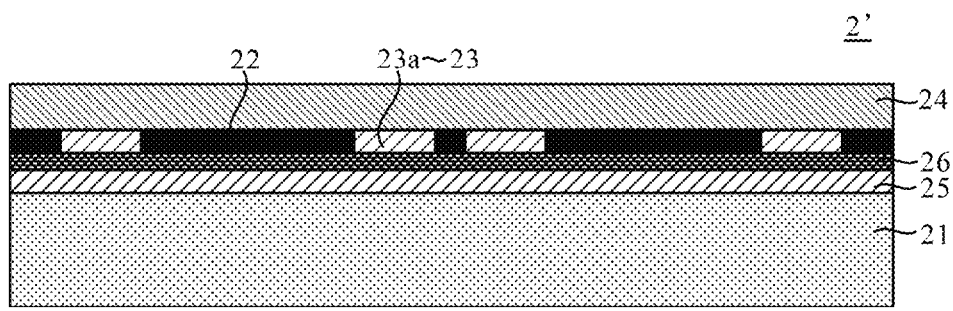
FIG. 13 is a schematic diagram of an opposite substrate, in accordance with some embodiments of the present disclosure.

As shown in FIG. 13, some embodiments of the present disclosure provide an opposite substrate 2'.

(1) The opposite substrate 2' includes:
  a second base substrate 21;
  an organic transmission layer 24 disposed at a side of the second base substrate 21; and
  a third buffer layer 25 disposed between the second base substrate 21 and the organic transmission layer 24.

The direction of the internal stress of the third buffer layer 25 is opposite to the direction of the internal stress of the organic transmission layer 24.

(2) According to the opposite substrate 2' described in (1), the material of the third buffer layer 25 is silicon nitride.

(3) According to the opposite substrate 2' described in (2), the thickness of the organic transmission layer 24 is 15 μm to 20 μm, and the thickness of the third buffer layer 25 is 0.5 μm to 1 μm.

(4) According to the opposite substrate 2' described in (1) to (3), the opposite substrate 2' further includes: a bonding layer 26 disposed between the organic transmission layer 24 and the third buffer layer 25.

(5) According to the opposite substrate 2' described in (4), the material of the bonding layer 26 is silicon dioxide, and the thickness of the bonding layer 26 is 0.3 μm.

(6) According to the opposite substrate 2' described in (1) to (5), the opposite substrate 2' further includes: a black matrix layer 22 disposed on the side of the organic transmission layer 24 proximate to the second base substrate 21, and the black matrix layer 22 has a plurality of openings.

Figure 14:
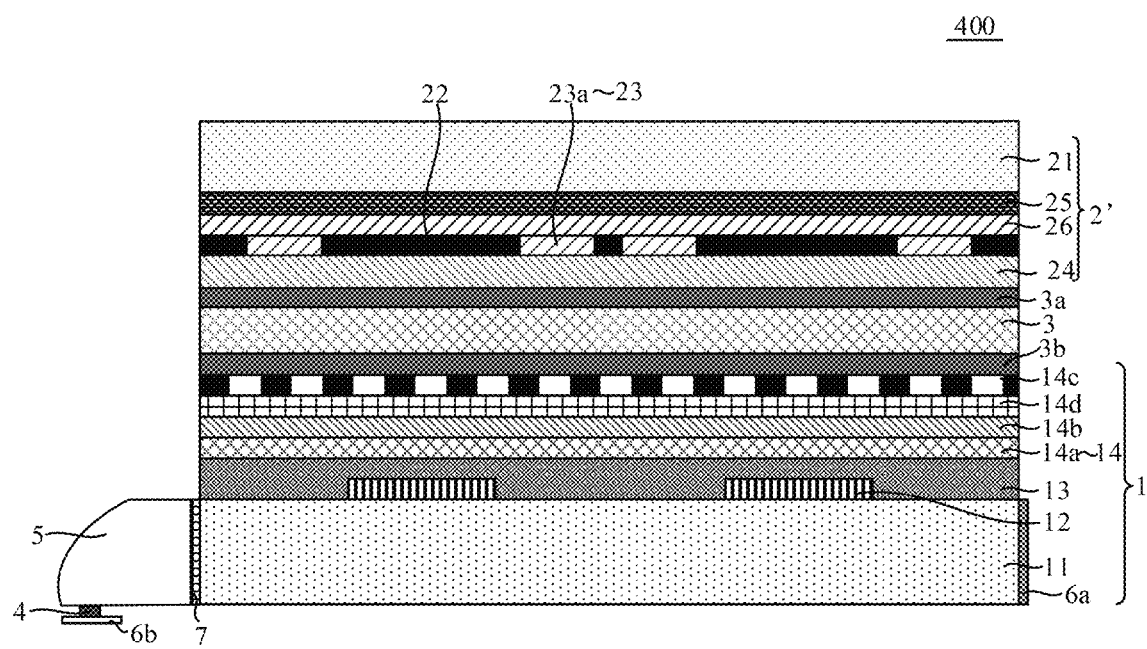
FIG. 14 is a schematic diagram of yet another liquid crystal display apparatus, in accordance with some embodiments of the present disclosure.

As shown in FIG. 14, some embodiments of the present disclosure further provide a liquid crystal display apparatus 400. The liquid crystal display apparatus 400 includes a light guide substrate 1, the opposite substrate 2' and a liquid crystal layer 3.

The light guide substrate 1 includes:
a first base substrate 11;
a plurality of light extraction grating units 12 disposed at a side of the first base substrate 11 facing the opposite substrate 2';
a planarization layer 13 covering the plurality of light extraction grating units 12;
a pixel driving structure 14 disposed on a side of the planarization layer 13 away from the first base substrate 11, and the pixel driving structure 14 includes a plurality of thin film transistors 14a;
a pixel electrode layer 14b disposed on a side of the pixel driving structure 14 away from the first base substrate 11; and
a common electrode layer 14c disposed on a side of the pixel electrode layer 14b away from the first base substrate 11.

The opposite substrate 2' and the light guide substrate 1 are disposed opposite to each other. The black matrix layer 22 has a plurality of openings, and the orthographic projections of the plurality of light extraction grating units 12 on the first base substrate 11 are within a range of the orthographic projection of the black matrix layer 22 on the first base substrate 11.

The liquid crystal layer is disposed between the light guide substrate 1 and the opposite substrate 2'. The liquid crystal layer 3 is configured to, under the action of the electric field, make the light exiting from the light guide substrate 1 reach the black matrix layer; or, make the light exiting from the light guide substrate 1 reach the light exit region formed by the plurality of openings of the black matrix layer 22.

In the above liquid crystal display apparatus 400, since the opposite substrate 2' includes the organic transmission layer 24 and the third buffer layer 25, and the direction of the internal stress of the third buffer layer 25 is opposite to the direction of the internal stress of the organic transmission layer 24, the amount of warpage of the opposite substrate 2' is low, and thus the flatness of the overall liquid crystal display apparatus 400 is high, and the product quality is good. In addition, the opposite substrate 2' is provided with the organic transmission layer 24, therefore, the liquid crystal layer 3, under the action of the electric field, can make more light exiting from the light guide substrate 1 reach the light exit regions formed by the plurality of openings of the black matrix layer, which improves the display brightness of the liquid crystal display apparatus 400.

In some embodiments, with continued reference to FIG. 14, the liquid crystal display apparatus 400 further includes a first alignment layer 3a, a second alignment layer 3b, a light source 4, a collimating lampshade 5, an adhesive layer 7, a first reflective sheet 6a and a second reflective sheet 6b. With respect to the structures, arrangement manners and functions of the above components, reference may be made to the description of the relevant contents of the liquid crystal display apparatus 200.

Figure 15:
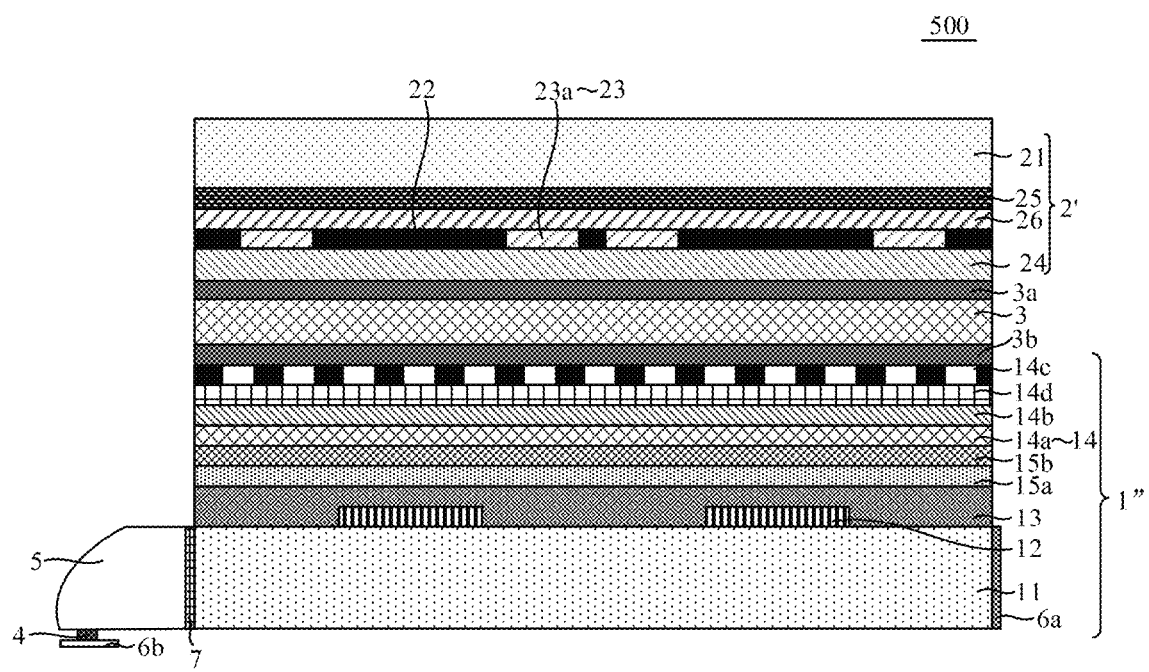
FIG. 15 is a schematic diagram of yet another liquid crystal display apparatus, in accordance with some embodiments of the present disclosure.

As shown in FIG. 15, some embodiments of the present disclosure provide a liquid crystal display apparatus 500. The liquid crystal display apparatus 500 includes the light guide substrate 1", the opposite substrate 2' and the liquid crystal layer 3. The light guide substrate 1" is the light guide substrate 1" provided by the embodiments of the present disclosure, the opposite substrate 2' is the opposite substrate 2' provided by the embodiments of the present disclosure, and the light guide substrate 1" and the opposite substrate 2' are disposed opposite to each other. The liquid crystal layer 3 is disposed between the light guide substrate 1" and the opposite substrate 2'. The liquid crystal layer 3 is configured to, under the action of the electric field, make the light exiting from the light guide substrate 1" reach the black matrix layer; or, make the light exiting from the light guide substrate 1" reach the light exit regions formed by the plurality of openings of the black matrix layer 22.

The light guide substrate 1" included in the liquid crystal display apparatus 500 is provided with a first buffer layer 15a and a second buffer layer 15b, so that the light locking ability of the laminated structure composed of the planarization layer 13, the first buffer layer 15a and the second buffer layer 15b is improved, so that the light leakage amount of the light-guide substrate 1" is low, and the light utilization rate is high. In this way, in a case where the liquid crystal display apparatus 500 is in a dark state, the uneven display phenomenon in the dark state is reduced, and in a case where the liquid crystal display apparatus 500 is in a bright state, the display brightness is improved.

Since the opposite substrate 2' includes the organic transmission layer 24 and the third buffer layer 25, and the direction of the internal stress of the third buffer layer 25 is opposite to the direction of the internal stress of the organic transmission layer 24, the amount of warpage of the opposite substrate 2' is low, and thus the flatness of the overall liquid crystal display apparatus 500 is high, and the product quality is good. In addition, the opposite substrate 2' is provided with the organic transmission layer 24, therefore, the liquid crystal layer 3, under the action of the electric field, can make more light exiting from the light guide substrate 1 reach the light exit regions formed by the plurality of openings of the black matrix layer 22, which improves the display brightness of the liquid crystal display apparatus 500.

In some embodiments, as shown in FIG. 15, the liquid crystal display apparatus 500 further includes a first alignment layer 3a, a second alignment layer 3b, a light source 4, a collimating lampshade 5, an adhesive layer 7, a first reflective sheet 6a and a second reflective sheet 6b. With respect to the structures, arrangement manners and functions of the above components, reference may be made to the description of the relevant contents above, which will not be repeated here.

In some embodiments, the light guide substrate 1" in the liquid crystal display apparatus 300, the light guide substrate 1 in the liquid crystal display apparatus 400, and the light guide substrate 1" in the liquid crystal display apparatus 500 all are manufactured by using the manufacturing method provided by the present disclosure. During the manufacturing process, since the interface protection layer 16 covers the first base substrate 11, which protects the first base substrate 11, damage to the portions of the surface of the first base substrate 11 corresponding to the non-light extraction opening regions B is avoided. As a result, the portions of the surface of the first base substrate 11 corresponding to the non-light extraction opening regions B are smooth, which reduces occurrence of light leakage phenomenon in the non-light extraction opening regions B of the first base substrate 11, and ensures that more light exits from the plurality of light extraction grating units 12 in the plurality of light extraction opening regions A at a collimation angle. In this way, the display effects of the liquid crystal display apparatus 300, the liquid crystal display apparatus 400, and the liquid crystal display apparatus 500 are improved.

The foregoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A method of manufacturing a light guide substrate, comprising:
    providing a first base substrate; wherein the first base substrate includes a plurality of light extraction opening regions and non-light extraction opening regions other than the plurality of light extraction opening regions;
    forming an interface protection layer on a side of the first base substrate;
    patterning the interface protection layer and removing portions of the interface protection layer corresponding to the plurality of light extraction opening regions;
    forming a grating structure layer at the side of the first base substrate where the interface protection layer has been formed;
    removing portions of the grating structure layer corresponding to the non-light extraction opening regions, so as to obtain a plurality of light extraction grating units in one-to-one correspondence with the plurality of light extraction opening regions; and
    removing portions of the interface protection layer corresponding to the non-light extraction opening regions.

2. The method of manufacturing the light guide substrate according to claim 1, wherein in the patterning the interface protection layer, and removing portions of the interface protection layer corresponding to the plurality of light extraction opening regions, and the removing portions of the interface protection layer corresponding to the non-light extraction opening regions, a wet etching process is used to remove corresponding portions of the interface protection layer.

3. The method of manufacturing the light guide substrate according to claim 1, wherein a material of the interface protection layer is metal, metal alloy or metal oxide.

4. The method of manufacturing the light guide substrate according to claim 1, wherein in the removing portions of the grating structure layer corresponding to the non-light extraction opening regions, when the portions of the grating structure layer corresponding to the non-light extraction opening regions are completely removed, in the portions of the interface protection layer corresponding to the non-light extraction opening regions, a thickness of a part thereof that is not covered by the grating structure layer is greater than or equal to 0.

5. The method of manufacturing the light guide substrate according to claim 4, wherein an etching process is used to remove the portions of the grating structure layer corresponding to the non-light extraction opening regions; and
    in the removing portions of the grating structure layer corresponding to the non-light extraction opening regions, etching selectivity of etching a material of the grating structure layer to etching a material of the interface protection layer is greater than or equal to 10.

6. The method of manufacturing the light guide substrate according to claim 4, wherein in the removing portions of the grating structure layer corresponding to the non-light extraction opening regions, a dry etching process is used to remove corresponding portion of the grating structure layer.

7. The method of manufacturing the light guide substrate according to claim 1, wherein the removing portions of the grating structure layer corresponding to the non-light extraction opening regions includes:
    forming a protective adhesive layer on a side of portions of the grating structure layer corresponding to the light extraction opening regions away from the first base substrate, so that the protective adhesive layer covers the portions of the grating structure layer corresponding to the light extraction opening regions;
    removing the portions of the grating structure layer corresponding to the non-light extraction opening regions; and
    removing the protective adhesive layer.

8. A light guide substrate, wherein the light guide substrate is manufactured by the method according to claim 1, the light guide substrate comprises:
    the first base substrate, wherein the first base substrate includes the plurality of light extraction opening regions and non-light extraction opening regions other than the plurality of light extraction opening regions; and
    the plurality of light extraction grating units disposed at the side of the first base substrate.

9. The light guide substrate according to claim 8, further comprising:
    a planarization layer covering the plurality of light extraction grating units;
    a first buffer layer disposed on a side of the planarization layer away from the first base substrate; and
    a second buffer layer disposed on a side of the first buffer layer away from the first base substrate;
    wherein a material of the first buffer layer is different from a material of the second buffer layer.

10. The light guide substrate according to claim 9, wherein a refractive index of the first buffer layer is between a refractive index of the planarization layer and a refractive index of the second buffer layer; or
    the material of the first buffer layer is oxide, the material of the second buffer layer is nitride, and the material of the first buffer layer and the material of the second buffer layer include a same element.

11. The light guide substrate according to claim 10, wherein the material of the first buffer layer is silicon oxide, and the material of the second buffer layer is silicon nitride.

12. The light guide substrate according to claim 11, wherein a thickness of the first buffer layer is 0.3 µm, a thickness of the second buffer layer is 0.1 μm, and a thickness of the planarization layer is 0.825 μm.

13. The light guide substrate according to claim 9, further comprising a pixel driving structure disposed on a side of the second buffer layer away from the first base substrate, and the pixel driving structure including a plurality of thin film transistors;
  a pixel electrode layer disposed on a side of the pixel driving structure away from the first base substrate; and
  a common electrode layer disposed on a side of the pixel electrode layer away from the first base substrate;
  wherein a density of the second buffer layer is higher than a density of the planarization layer, and the density of the second buffer layer is higher than a density of the first buffer layer.

14. A liquid crystal display apparatus, comprising:
the light guide substrate according to claim 8; and
an opposite substrate disposed opposite to the light guide substrate;
wherein the opposite substrate includes:
a second base substrate;
a black matrix layer disposed at a side of the second base substrate proximate to the light guide substrate;
wherein the black matrix layer has a plurality of openings, and orthographic projections of a plurality of light extraction grating units on the first base substrate are within a range of an orthographic projection of the black matrix layer on the first base substrate; and
a liquid crystal layer disposed between the light guide substrate and the opposite substrate;
wherein the liquid crystal layer is configured such that, under action of an electric field, light exiting from the light guide substrate reaches the black matrix layer; or, the light exiting from the light guide substrate reaches light exit regions formed by the plurality of openings of the black matrix layer.

15. The liquid crystal display apparatus according to claim 14, wherein the opposite substrate further includes:
  an organic transmission layer disposed on a side of the black matrix layer away from the second base substrate; and
  a third buffer layer disposed at a side of the black matrix layer proximate to the second base substrate;
  wherein a direction of an internal stress of the third buffer layer is opposite to a direction of an internal stress of the organic transmission layer.

16. The liquid crystal display apparatus according to claim 15, wherein a material of the third buffer layer is silicon nitride.

17. The liquid crystal display apparatus according to claim 16, wherein a thickness of the organic transmission layer is 15 μm to 20 μm, and a thickness of the third buffer layer is 0.5 μm to 1 μm.

18. The liquid crystal display apparatus according to claim 15, wherein the opposite substrate further includes:
  a bonding layer, disposed between the third buffer layer and the black matrix layer.

19. The liquid crystal display apparatus according to claim 18, wherein a material of the bonding layer is silicon dioxide, and a thickness of the bonding layer is 0.3 μm.

* * * * *